(12) United States Patent
Remcho et al.

(10) Patent No.: US 11,813,608 B2
(45) Date of Patent: Nov. 14, 2023

(54) FIBER SUBSTRATE-BASED FLUIDIC ANALYTICAL DEVICES AND METHODS OF MAKING AND USING THE SAME

(71) Applicant: Oregon State University, Corvallis, OR (US)

(72) Inventors: Vincent Remcho, Corvallis, OR (US); Saichon Sumantakul, Corvallis, OR (US)

(73) Assignee: Oregon State University, Corvallis, OR (US)

(*) Notice: Subject to any disclaimer, the term of this patent is extended or adjusted under 35 U.S.C. 154(b) by 234 days.

(21) Appl. No.: 17/481,159

(22) Filed: Sep. 21, 2021

(65) Prior Publication Data

US 2022/0088593 A1     Mar. 24, 2022

Related U.S. Application Data

(60) Provisional application No. 63/081,673, filed on Sep. 22, 2020.

(51) Int. Cl.
    *C12N 15/10*      (2006.01)
    *B01L 3/00*      (2006.01)
    (Continued)

(52) U.S. Cl.
     CPC .... *B01L 3/502707* (2013.01); *B29C 65/1635* (2013.01); *B01L 2300/0829* (2013.01);
    (Continued)

(58) Field of Classification Search
     CPC ....... B01L 3/502707; B01L 2300/0829; B01L 2300/0887; B01L 2300/126; B01L 2300/165; B01L 2300/0874
     See application file for complete search history.

(56) References Cited

U.S. PATENT DOCUMENTS 6,880,576 B2    4/2005    Karp et al.
7,955,504 B1    6/2011    Jovanovic et al.
(Continued)

FOREIGN PATENT DOCUMENTS

CN     204356318 U    8/2014
CN     105572795 A    12/2015
(Continued)

OTHER PUBLICATIONS

Cardoso et al., "Colorimetric determination of nitrite in clinical, food and environmental samples using microfluidic devices stamped in paper platforms," *Anal. Methods*, 7:7311-7317 (Aug. 2015).
(Continued)

*Primary Examiner* — Jennifer Wecker
*Assistant Examiner* — Oyeleye Alexander Alabi
(74) *Attorney, Agent, or Firm* — Klarquist Sparkman, LLP

(57) ABSTRACT

Embodiments of fiber substrate-based fluidic device and methods of manufacturing the same are described herein. In one example, a method of manufacturing a fiber substrate-based fluidic device comprises bonding a hydrophobic film that is substantially transparent to a laser beam (e.g., a film that transmits at least 80% of the incident radiant power of the laser beam) to a hydrophilic substrate and ablating the hydrophilic substrate with the laser beam without ablating the hydrophobic film to form one or more fluidly sealed channels in the hydrophilic substrate.

16 Claims, 21 Drawing Sheets

(51) Int. Cl.
    *G01N 35/10* (2006.01)
    *B01L 3/02* (2006.01)
    *B29C 65/16* (2006.01)
(52) U.S. Cl.
    CPC .. *B01L 2300/0887* (2013.01); *B01L 2300/126* (2013.01); *B01L 2300/165* (2013.01)

(56) References Cited

U.S. PATENT DOCUMENTS

| | | | |
|---|---|---|---|
| 8,591,834 B2 | 11/2013 | Cohen et al. | |
| 8,628,729 B2 | 1/2014 | Carrilho et al. | |
| 8,821,810 B2 | 9/2014 | Whitesides et al. | |
| 9,533,879 B2 | 1/2017 | Cao et al. | |
| 9,546,932 B2 | 1/2017 | Putnam et al. | |
| 11,123,731 B2 | 9/2021 | Fang et al. | |
| 2002/0176804 A1 | 11/2002 | Strand et al. | |
| 2014/0246801 A1 | 9/2014 | Olde Riekerink et al. | |
| 2015/0132742 A1* | 5/2015 | Thuo ............... | B01L 3/502707 436/71 |
| 2016/0016164 A1 | 1/2016 | Cohen et al. | |

FOREIGN PATENT DOCUMENTS

| | | |
|---|---|---|
| EP | 2159573 A1 | 8/2008 |
| EP | 2537657 A2 | 12/2012 |
| EP | 2300165 B1 | 9/2019 |
| EP | 2822688 B1 | 9/2019 |
| WO | WO 2001/025138 A1 | 4/2001 |
| WO | WO 2018/032112 A1 | 2/2018 |

OTHER PUBLICATIONS

Chitnis et al., "Laser-treated hydrophobic paper: an inexpensive microfluidic platform,"*Lab Chip*, 11:1161-1165 (Jan. 2011).
Conroy, "Investigation of Improved Label Cutting By $CO_2$ Lasers With Wavelength Optimization," Paper #2004, *Applications Lab, Synrad Inc.*, 5 pages (Jan. 2016).
De Oliveira et al., "A simple method to produce 2D and 3D microfluidic paper-based analytical devices for clinical analysis,"*Analytica Chimica Acta*, 957:40-46 (Jan. 2017).
Fan et al., Fully enclosed paper-based microfluidic devices using bio-compatible adhesive seals, *Microsyst Technol*, 24:1783-1787 (Aug. 2017).
Fenton, et al., "Multiplex Lateral-Flow Test Strips Fabricated by Two-Dimensional Shaping,"*ACS Appl. Mater. Interfaces*, 1(1):124-129 (Nov. 2008).
He et al., "Laser-based patterning for fluidic devices in nitrocellulose," *Biomicrofluidics*, 9:026503-01-026503-10 (Apr. 2015).
He et al., "Laser direct-write for fabrication of three-dimensional paper-based devices,"*Lab Chip*, 16:3296-3303 (Jul. 2016).
Humbert et al., "A rapid diagnostic test for human Visceral Leishmaniasis using novel Leishmania antigens in a Laser Direct-Write Lateral Flow Device," *Emerging Microbes & Infections*, 8:1178-1185 (Aug. 2019).
Kim et al., "Laminated and Infused Parafilm®—Paper for Paper-based Analytical Devices," *Sens Actuators B Chem.*, 255(3):3654-3661 (Feb. 2018).
Koesdjojo et al., "Cost Effective Paper-Based Colorimetric Microfluidic Devices and Mobile Phone Camera Readers for the Classroom," *J. Chem. Educ.*, 92:737-741 (Mar. 2015).
Le et al., "Fabrication of paper devices via laser-heating-wax-printing for high-tech enzyme-linked immunosorbent assays with low-tech pen-type pH meter readout," *Analyst*, 142:511-516 (Jan. 2017).
Liu et al., "Laser carved micro-crack channels in paper-based dilution devices," *Talanta*, 175:289-296 (Jul. 2017).
Mahdavifar et al., "A Nitrocellulose-Based Microfluidic Device for Generation of Concentration Gradients and Study of Bacterial Chemotaxis," *Journal of the Electrochemical Society*, 161(2):B3064-B3070 (Dec. 2013).
Mahmud et al., "Creating compact and microscale features in paper-based devices by laser cutting," *Analyst*, 141:6449-6454 (Oct. 2016).
Martinez et al., "Three-Dimensional Microfluidic Devices Fabricated in Layered Paper and Tape," *PNAS*, 105(50):19606-19611 (Dec. 2008).
McDonald et al., "Fabrication of Microfluidic Systems in Poly(Dimethylsiloxane)," *Electrophoresis*, 21:27-40 (Jan. 2000).
Nie et al., "One-step patterning of hollow microstructures in paper by laser cutting to create microfluidic analytical devices," *Analyst*, 138:671-676 (Jan. 2013).
Rafatmah et al., "Fabrication of the First Disposable Three-dimensional Paper-based Concentration Cell as Ammonia Sensor with a New Method for Paper Hydrophobization by Laser Patterned Parafilm®," *Electroanalysis*, 31:632-638 (Jan. 2019).
Rahimi et al., "Comparison of Direct and Indirect Laser Ablation of Metallized Paper for Inexpensive Paper-Based Sensors," *ACS Appl. Mater. Interfaces*, 10:36332-36341 (Oct. 2018).
Singh et al., "Paper-Based Sensors: Emerging Themes and Applications," *Sensors*, 18(2838):1-22 (Aug. 2018).
Sones et al., "Laser-induced photo-polymerisation for creation of paper-based fluidic devices," *Lab Chip*, 14:4567-4574 (Sep. 2014).
Spicar-Mihalic et al., "$CO_2$ laser cutting and ablative etching for the fabrication of paper-based devices," *J. Micromech. Microeng.*, 23(6):067003, 7 pages (May 2013).
Xia et al., "Fabrication Techniques for Microfluidic Paper-Based Analytical Devices and their Applications for Biological Testing: A Review," *Biosensors and Bioelectronics*, 77:774-789 (Oct. 2015).
Zhang et al., "Laser-induced selective wax reflow for paper-based microfluidics," *RSC Adv.*, 9:11460-11464 (Apr. 2019).

* cited by examiner

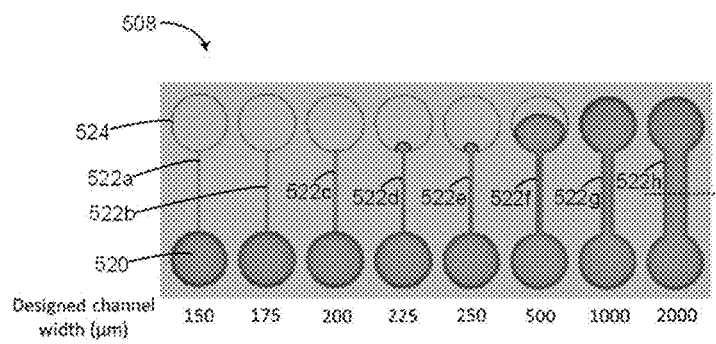 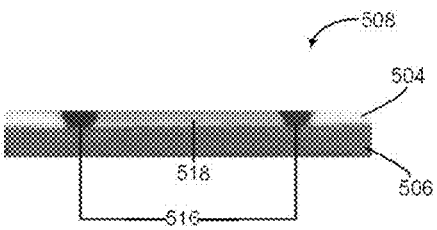
FIG. 5A  FIG. 5B
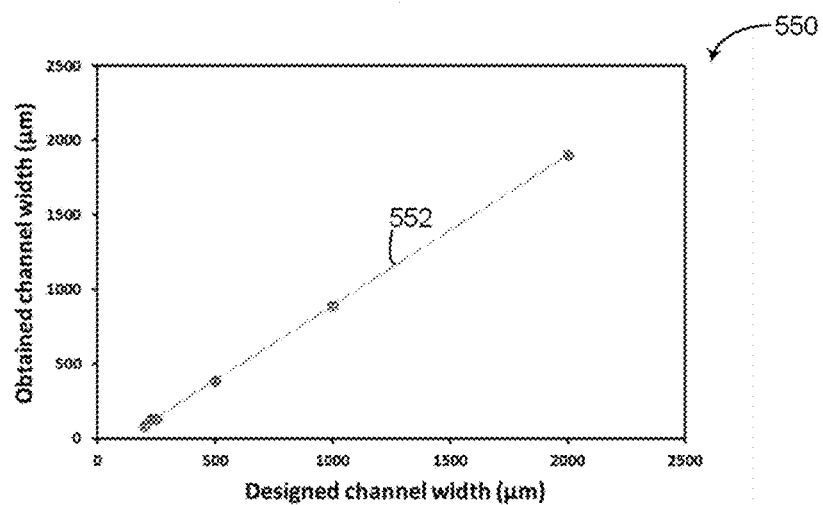
FIG. 5C

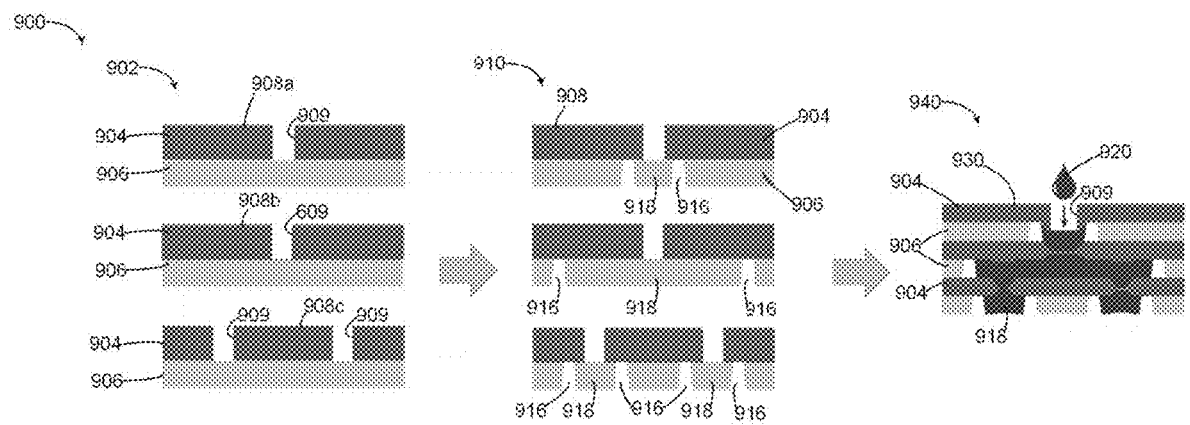
FIG. 9
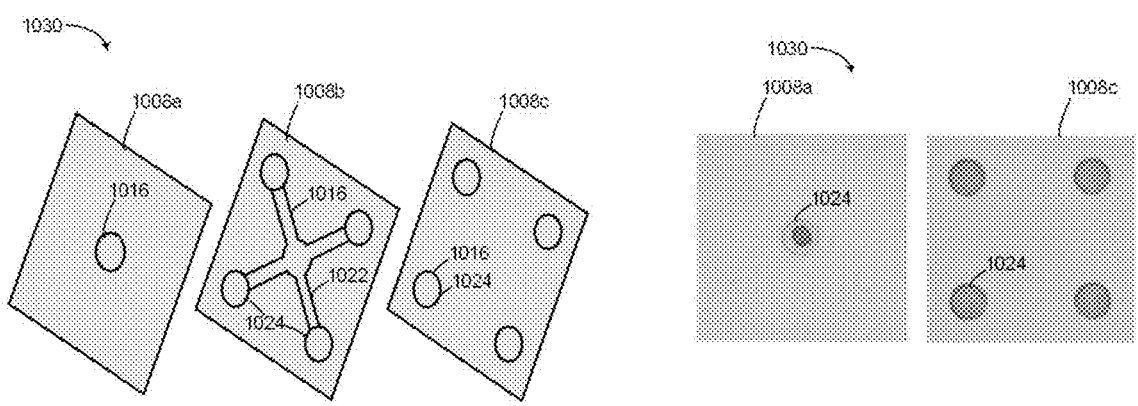
FIG. 10A
FIG. 10B

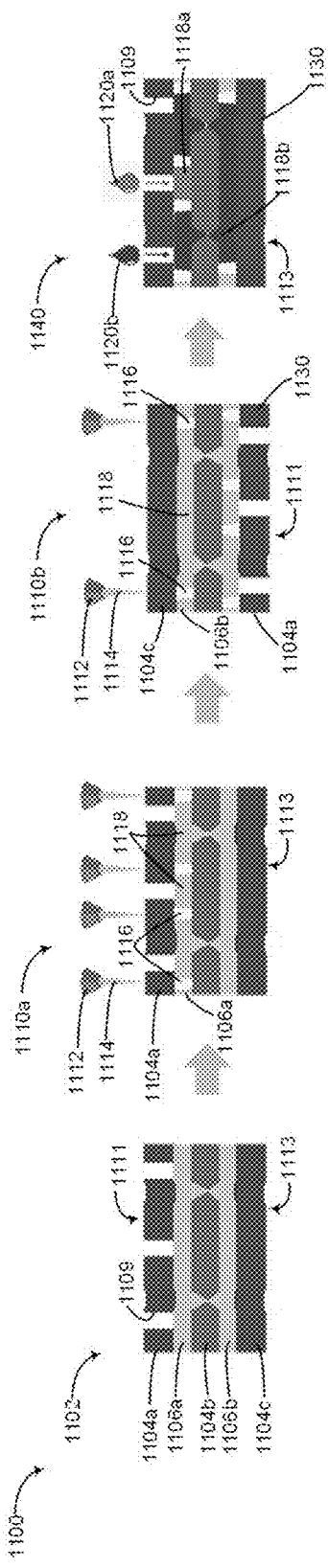
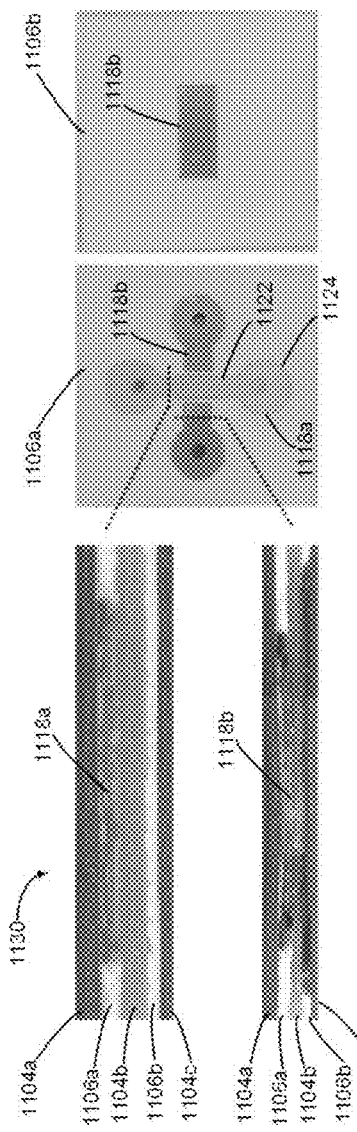
FIG. 11A
FIG. 11B

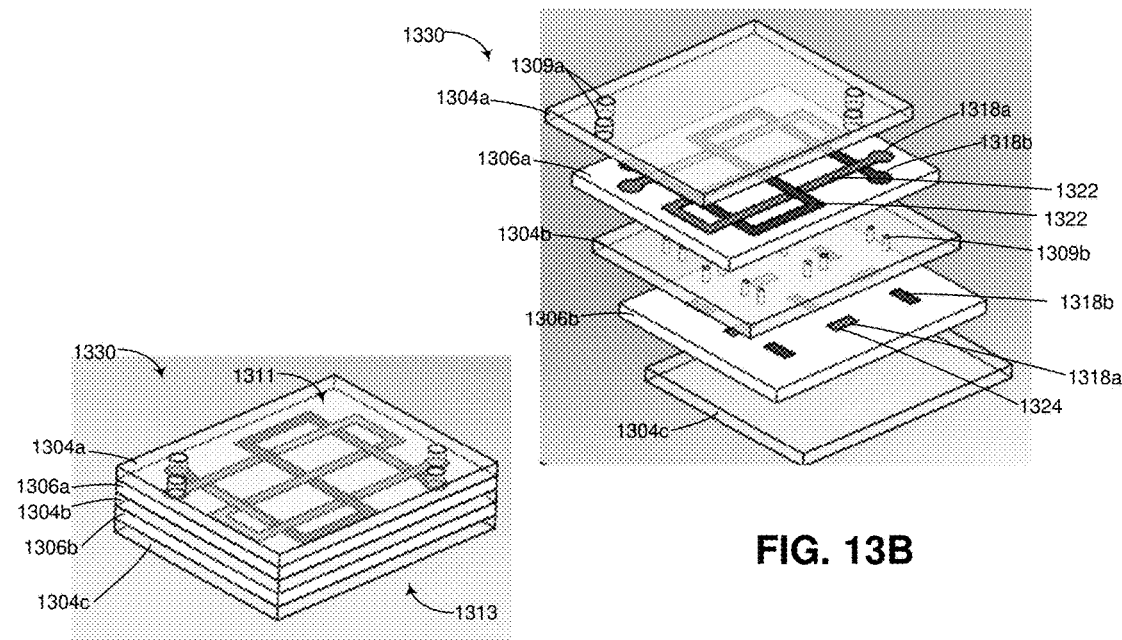
FIG. 13A
FIG. 13B
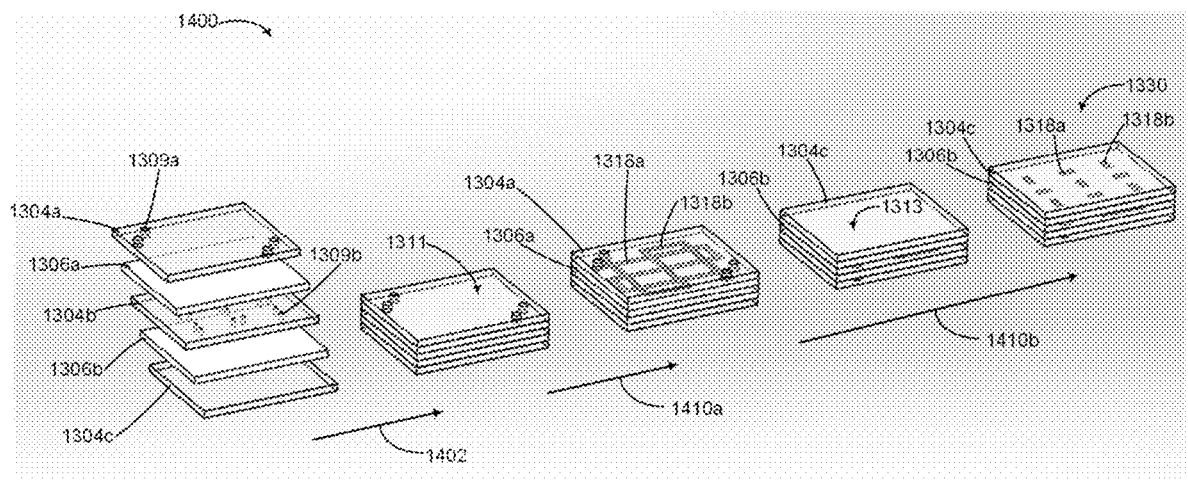
FIG. 14

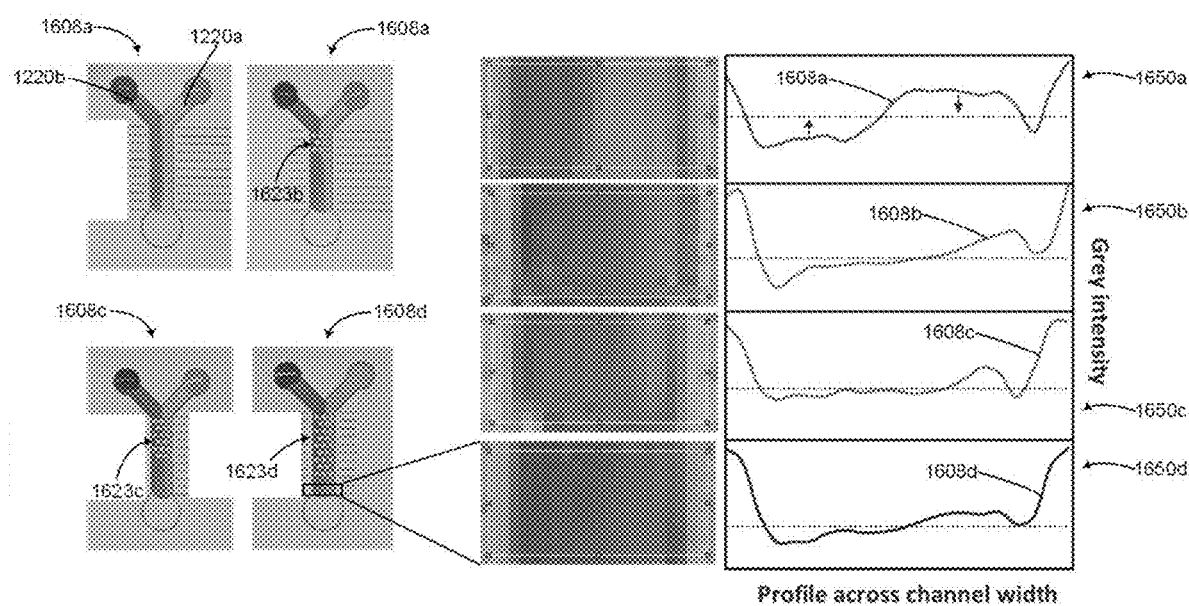
FIG. 16A  FIG. 16B

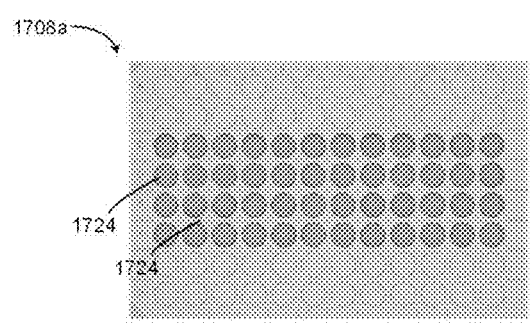
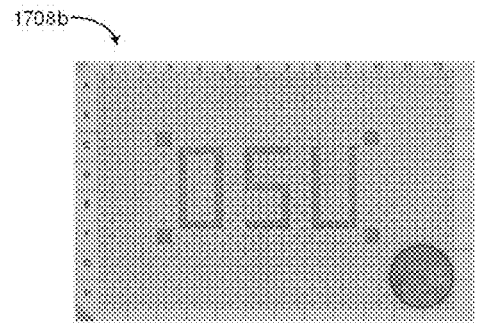
FIG. 17A   FIG. 17B
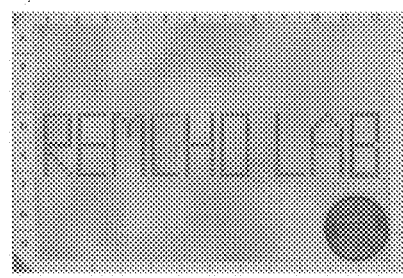
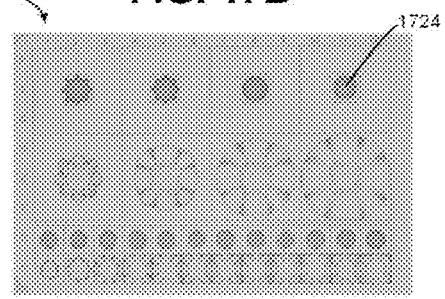
FIG. 17C   FIG. 17D
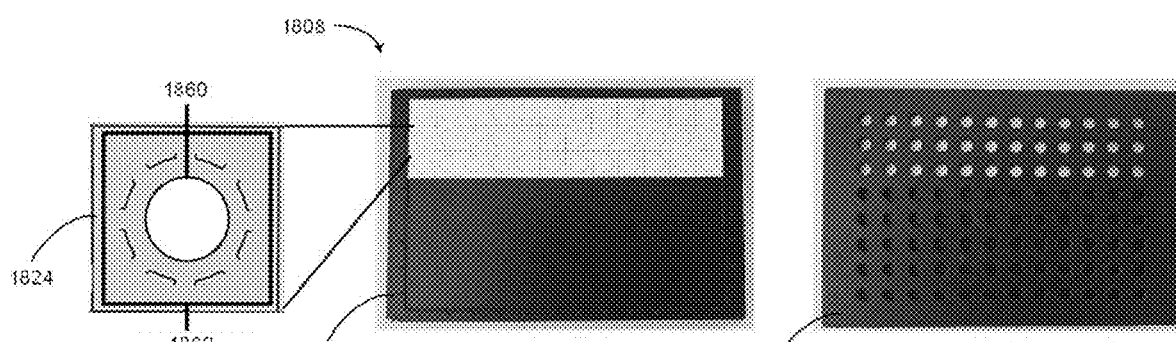
FIG. 18A
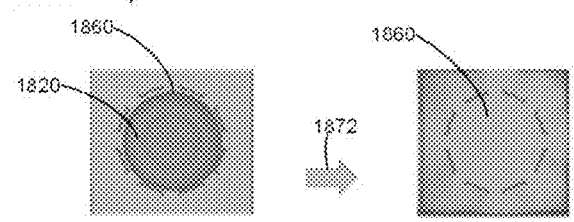
FIG. 18B

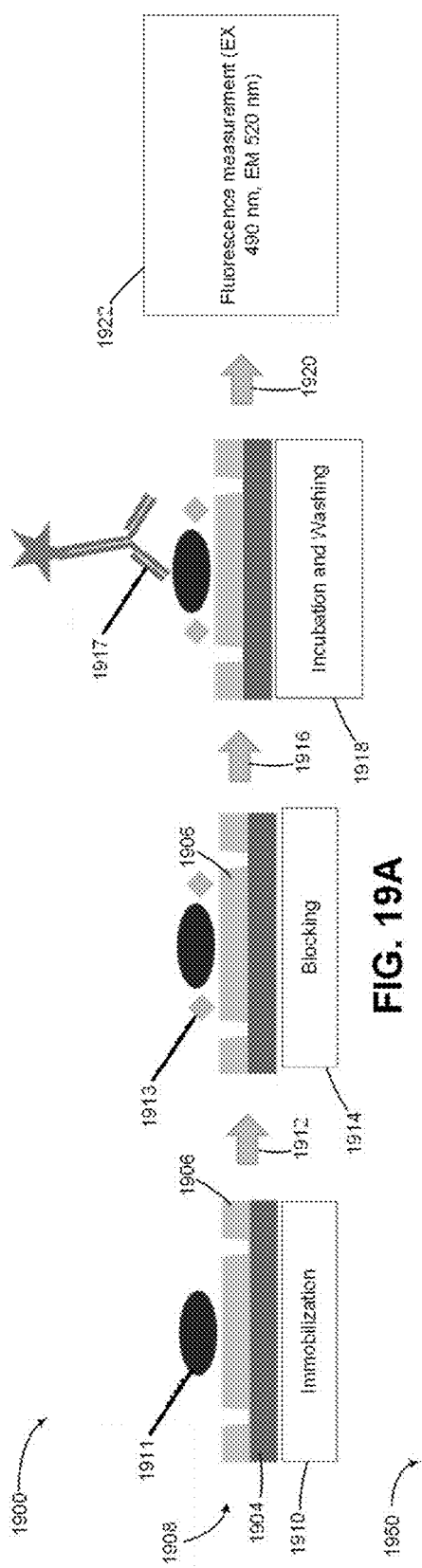
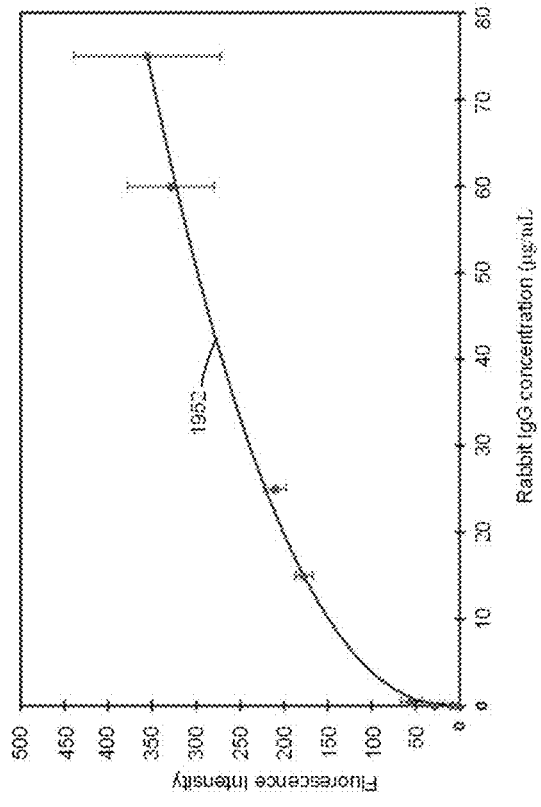
FIG. 19A
FIG. 19B

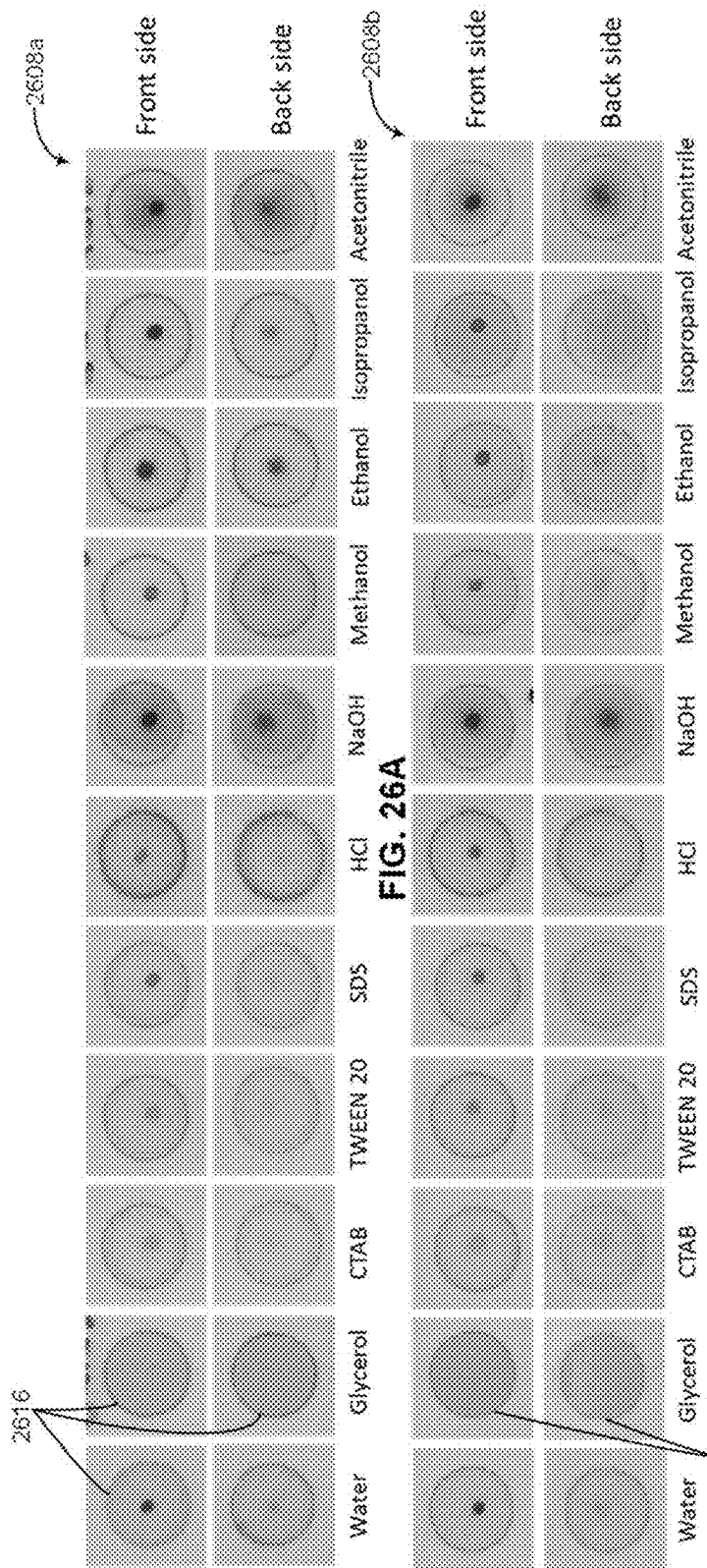

FIBER SUBSTRATE-BASED FLUIDIC ANALYTICAL DEVICES AND METHODS OF MAKING AND USING THE SAME

CROSS REFERENCE TO RELATED APPLICATION

This application claims the benefit of the earlier filing date of U.S. Provisional Application No. 63/081,673, filed Sep. 22, 2020, the entirety of which is incorporated herein by reference.

FIELD

The present disclosure concerns fiber substrate-based fluidic analytical devices and methods of making and using the same.

BACKGROUND

Microfluidic paper-based analytical devices (µPADS) are relatively cheap and portable diagnostic tools that can be used in the field to test for analytes of interest (e.g., biological molecules, pathogens, environmental toxins, etc.). As such, they are particularly popular in the developing world for diagnosing disease, testing for heavy metals, screening for food contaminants (e.g., *E. coli* and *Salmonella*), etc. However, current processes for manufacturing µPADS are expensive and time consuming. For example, conventional manufacturing process require forming layers of the devices as separate components before assembly. Once fully formed (i.e., cut to specifications) the different layers of the device then have to be carefully aligned and bonded together during assembly so that corresponding features in the layers overlie one another. A need in the art exists for cellulose-based fluidic devices that can be manufactured using methods that overcome these drawbacks.

SUMMARY

Disclosed herein are embodiments of substrate-based fluidic analytical devices and methods of manufacturing the same.

In one embodiment, a method, comprises bonding a hydrophobic film to a hydrophilic substrate; directing a laser beam through the hydrophobic film to the hydrophilic substrate, wherein the hydrophobic film transmits at least 80% of the incident radiant power of the laser beam; and ablating the hydrophilic substrate with the laser beam without ablating the hydrophobic film.

In another embodiment, a method for manufacturing a fiber substrate-based fluidic device, such as a microfluidic device, comprises bonding a first hydrophobic film to a first side of a hydrophilic substrate and bonding a second hydrophobic film to an opposite second side of the hydrophilic substrate; and directing a laser beam through at least one of the hydrophobic films without ablating the hydrophobic film and ablating the hydrophilic substrate with the laser beam, wherein the hydrophobic film transmits at least 80% of the incident radiant power of the laser beam.

In yet another embodiment, a method for manufacturing a fiber substrate-based fluidic device, such as a microfluidic device, comprises stacking three hydrophobic films and two hydrophilic substrates in an alternating order to form a 5-layer stacked component; bonding the 5-layer stacked component; and ablating one of the hydrophilic substrates by directing a laser beam through one of the hydrophobic films from a first side of the 5-layer stacked component and ablating the other one of the hydrophilic substrates by directing the laser beam through one of the other hydrophobic films from an opposite second side of the 5-layer stacked component.

In yet a further embodiment, a method for manufacturing a fiber substrate-based fluidic device, such as a microfluidic device, comprises laminating, compressing, or adhering a layer of a wax-polyolefin or polymeric film on opposite sides of a nitrocellulose sheet; and forming wells and/or channels in the nitrocellulose sheet by ablating the nitrocellulose sheet with a carbon dioxide laser; wherein the layer of the wax-polyolefin film is not ablated by the laser.

In yet a further embodiment, a fiber substrate-based diagnostic device for detecting the presence and/or concentration of an analyte comprises a nitrocellulose substrate sandwiched between two laminated layers of wax-polyolefin film, wherein the nitrocellulose substrate comprises a plurality of wells and/or fluidic channels formed in the nitrocellulose substrate such that boundaries of the wells and/or fluidic channels are defined by the nitrocellulose substrate and at least one of the two laminated layers of the wax-polyolefin film.

BRIEF DESCRIPTION OF THE DRAWINGS

FIG. 5A is an illustration of fiber substrate-based fluidic devices having different designed channel widths that were manufactured using one or more of the exemplary methods described herein.

FIG. 5B is an image of a cross-section of an exemplary first type of fiber substrate-based fluidic device.

FIG. 5C is a graph illustrating how the channel width obtained from manufacturing a fiber substrate-based fluidic device using one or more of the exemplary methods described herein can differ from the designed channel width.

FIG. 9 is a schematic illustration of a third exemplary method for manufacturing a third type of fiber substrate-based fluidic device.

FIG. 10A is an exploded schematic illustration of an exemplary third type of fiber substrate-based fluidic device.

FIG. 10B illustrates top and bottom views of an exemplary third type of fiber substrate-based fluidic device.

FIG. 11A is a schematic illustration of a fourth exemplary method for manufacturing a fourth type of fiber substrate-based fluidic device.

FIG. 11B illustrates cross-sectional, top, and bottom views of an exemplary fourth type of fiber substrate-based fluidic device.

FIG. 13A illustrates an assembled view of an exemplary sixth type of fiber substrate-based fluidic device.

FIG. 13B illustrates an exploded view of the exemplary sixth type of fiber substrate-based fluidic device.

FIG. 14 is a schematic illustration of a sixth exemplary method for manufacturing the sixth type of fiber substrate-based fluidic device.

FIG. 16A illustrates fiber substrate-based fluidic devices manufactured using one or more of the exemplary methods described herein having varying numbers of flow obstructions FIG. 16B is a graph illustrating how the number of flow obstructions included in the channels of exemplary fiber substrate-based fluidic devices can affect the mixing of different samples in the channels.

FIG. 17A illustrates a top view of an exemplary seventh type of fiber substrate-based fluidic device manufactured using one or more of the exemplary methods described herein.

FIG. 17B illustrates a top view of another exemplary seventh type of fiber substrate-based fluidic device manufactured using one or more of the exemplary methods described herein.

FIG. 17C illustrates a top view of another exemplary seventh type of fiber substrate-based fluidic device manufactured using one or more of the exemplary methods described herein.

FIG. 17D illustrates a top view of yet another exemplary seventh type of fiber substrate-based fluidic device manufactured using one or more of the exemplary methods described herein.

FIG. 18A illustrates top and bottom views of an eighth type of fiber substrate-based fluidic device.

FIG. 18B is a schematic illustration of a method for washing the eighth type of fiber substrate-based fluidic device.

FIG. 19A is a schematic illustration of a method for using the eighth type of fiber substrate-based fluidic device to perform an immunoglobulin bioassay.

FIG. 19B is a graph illustrating the relationship between immunoglobulin concentration and detected fluorescence intensity in the immunoglobulin bioassay of FIG. 19A.

FIG. 26A shows images of exemplary fiber substrate-based fluidic devices having the sixth type of hydrophilic substrate and the first type of hydrophobic film, exposed to different liquid samples.

FIG. 26B shows images of exemplary fiber substrate-based fluidic devices having the sixth type of hydrophilic substrate and the second type of hydrophobic film, exposed to different liquid samples.

DETAILED DESCRIPTION

General Considerations

Figure 1A:
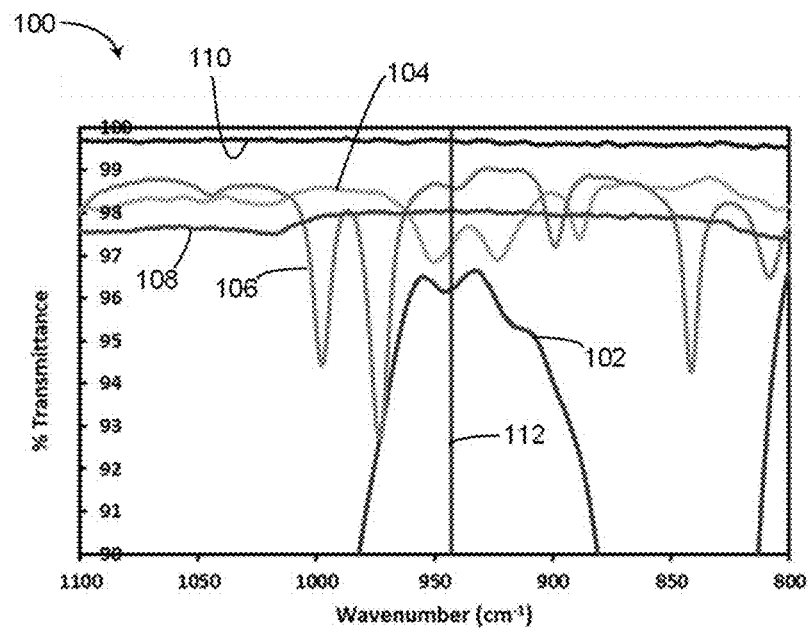
FIG. 1A is a graph illustrating the transparency of nitrocellulose and a variety of hydrophobic materials to a range of wavenumbers, including an example wavenumber of a carbon dioxide laser.

The following general consideration are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements unless the context clearly indicates otherwise.

Any theories of operation are to facilitate explanation, but the disclosed devices, materials, and methods are not limited to such theories of operation. Although the operations of some of the disclosed methods are described in a particular, sequential order for convenient presentation, it will be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed components and materials can be used in conjunction with other components and materials. Additionally, the description sometimes uses terms such as "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or devices are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

Definitions

To facilitate review of the various embodiments of the disclosure, the following explanations of specific terms are provided:

Bonding: Bonding refers to a process of forming a permanent coupling between components. Examples include laminating (with or without compression), welding, and adhering.

Channel: A narrow portion of a fluid receptacle that can join two or more wells and that is configured to transport a fluid sample, such as a liquid sample, via capillary action.

Fluid Barrier: A barrier that is configured to restrain the flow of a fluid sample, such as a liquid sample, in a fiber substrate-based fluidic device. For example, a fluid barrier can include an air gap or a wall of hydrophobic material that is impervious to the fluid sample.

Fluid Receptacle or Compartment: A portion of a hydrophilic substrate that is configured to receive and retain a fluid sample, such as a liquid sample. The fluid receptacle or compartment is partially or fully enclosed by a fluidic barrier and/or is otherwise fluidly sealed such that it prevents liquid from spreading to other areas of the hydrophilic substrate.

Hydrophilic Substrate: A substrate made of a hydrophilic material, such as nitrocellulose, cellulose, and/or a glass microfiber, that is configured to absorb a fluid sample, such as a liquid sample, that contains or may contain an analyte of interest. The hydrophilic substrates described herein can have a thickness of at least 0.0001 inches and at most 0.15 inches, including any ranges within these endpoints (inclusive of the endpoints themselves). The hydrophilic substrates can be substantially planar sheets, although other shapes are possible.

Hydrophobic Film: A thin layer of a hydrophobic material, such as a wax-polyolefin blend, adhesive tape, plastic film, toner, polyethylene, polypropylene, polylactic acid, polymethylmethacrylate, polydimethylsiloxane, and/or ethylene vinyl acetate, that is configured to be impervious to a fluid sample, such as a liquid sample, that contains or may contain an analyte of interest. In some embodiments, the hydrophobic film is configured to be impervious to many chemical substances as well, such as saline solutions, inorganic acids, alkaline solutions, organic solvents, and surfactants. The hydrophobic films described herein can have a thickness of at least 0.0001 inches and at most 0.15 inches, including any ranges within these endpoints (inclusive of the endpoints themselves). The hydrophobic films can be substantially planar sheets, although other shapes are possible. The hydrophobic film also is substantially transparent to a laser beam. For example, the hydrophobic films described herein can transmit at least 75%, at least 80%, at least 85%, at least 90%, at least 95%, at least at least 96%, at least 97%, and/or at least 98% of the incident power of a laser beam having a wavenumber between 800 and 1100 $cm^{-1}$.

Opening: An aperture or gap that allows a fluid (e.g., a liquid) or solid to pass there-through. In some embodiments, the openings are formed in the hydrophobic film. In some such embodiments, the openings can be at least 0.05 mm and at most 5 mm in diameter.

Well: A portion of or the fluid receptacle that is configured to initially receive and/or terminally retain a fluid sample, such as a liquid sample. Typically, the wells are circular, but it should be appreciated that they can have various other shapes in other embodiments.

Overview of the Disclosed Technology

Fiber substrate-based fluidic device embodiments and method embodiments for manufacturing these devices are described herein. The fiber substrate-based fluidic device embodiments can include a hydrophobic film positioned on a fiber-based substrate, such as a porous, hydrophilic substrate. In some embodiments, the hydrophobic film can comprise a hydrophobic material, such as a wax-polyolefin blend, adhesive tape, plastic film, toner, polyethylene, polypropylene, polylactic acid, polymethylmethacrylate, polydimethylsiloxane, and/or ethylene vinyl acetate. In some embodiments, the fiber-based substrate can comprise a hydrophilic porous material selected from nitrocellulose, cellulose, and/or a glass microfiber, or other such fiber-based materials. In particular embodiments, the hydrophobic film is substantially transparent to a laser beam, such that most (e.g., at least 75%) of the incident power of the laser beam passes straight through the hydrophobic film. Because of this, the laser beam can reach the hydrophilic substrate relatively unattenuated and can ablate the hydrophilic substrate.

Further, because the hydrophobic film has a relatively high flash point (e.g., higher than the hydrophilic substrate), the laser beam can ablate the hydrophilic substrate without compromising the integrity of the hydrophobic film. Ablating the hydrophilic substrate can create voids (e.g., air gaps) in the hydrophilic substrate and/or can bond together two or more layers of hydrophobic film. In this way, the air gaps, and/or the bound layers of hydrophobic film can serve as internal fluid barriers that direct, guide, and/or otherwise restrict fluid flow across the hydrophilic substrate. Together, these barriers and the hydrophobic film can form enclosed and fluidly-sealed fluid receptacles or compartments that can be used to collect and/or transport a fluid sample, such as a liquid sample, for analytical purposes. Also, because the hydrophobic film is substantially transparent to the laser, the fluid receptacles or compartments in the hydrophilic substrate can be formed after the device has been assembled, eliminating the need for careful and precise alignment processes, thereby simplifying, expediting, and reducing the cost of the overall manufacturing process.

Manufacturing method embodiments disclosed herein are rapid, low-cost, reliable, and suitable for mass production. In particular embodiments, the manufacturing process comprises two steps: a bonding step (e.g., thermal lamination, thermal press, or adhesive) and a laser ablation step. Such embodiments therefore are compatible with mass production. In particular embodiments, the manufacturing process does not require using any liquid reagents/chemicals and thus less waste is generated as compared to conventional methods. Also, the materials (e.g., fiber-based substrates, hydrophobic film, and the like) and equipment (e.g., thermal laminator, thermal press, laser cutter, and the like) used to manufacture the fiber substrate-based fluidic devices disclosed herein are low-cost, providing a cost-effective fabrication method. Further, fully formed devices can be bonded together to provide devices comprising as many layers as desired. The fiber substrate-based fluidic devices disclosed herein are modular in design and can be specifically tailored to meet individual needs by combining fully formed sub-units.

As described above, a laser can be used to perform the laser ablation step, such as by using the laser to cut and/or otherwise form channels in the hydrophilic substrate. Further, the laser can be precisely controlled to form flow obstructions (e.g., micropillar structures) in the channels to alter flow rates and/or facilitate mixing the fluid sample, such as a liquid sample. The microfluidic structures can be designed using a compatible design software program, such as SolidWorks® or AutoCAD®, and the laser can be guided using the same or similar software program, including instrument-vendor proprietary programs, including instrument-vendor proprietary programs. In particular embodiments, the laser can be selected from xenon chloride, xenon fluoride, helium cadmium, rhodamine 6G, copper vapor, argon, frequency doubled Nd:YAG, helium neon, krypton, ruby, laser diodes, and/or titanium:sapphire lasers.

Figure 2:
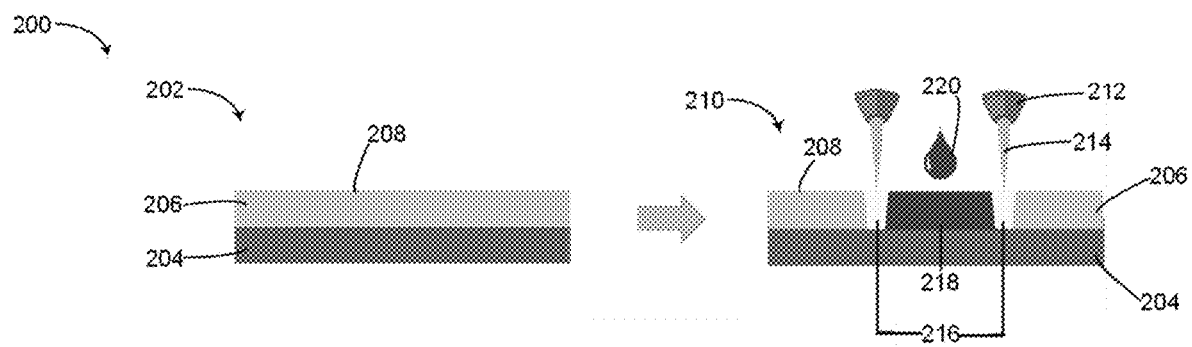
FIG. 2 is a schematic illustration of a first exemplary method for manufacturing a first type of fiber substrate-based fluidic device.
Figure 6:
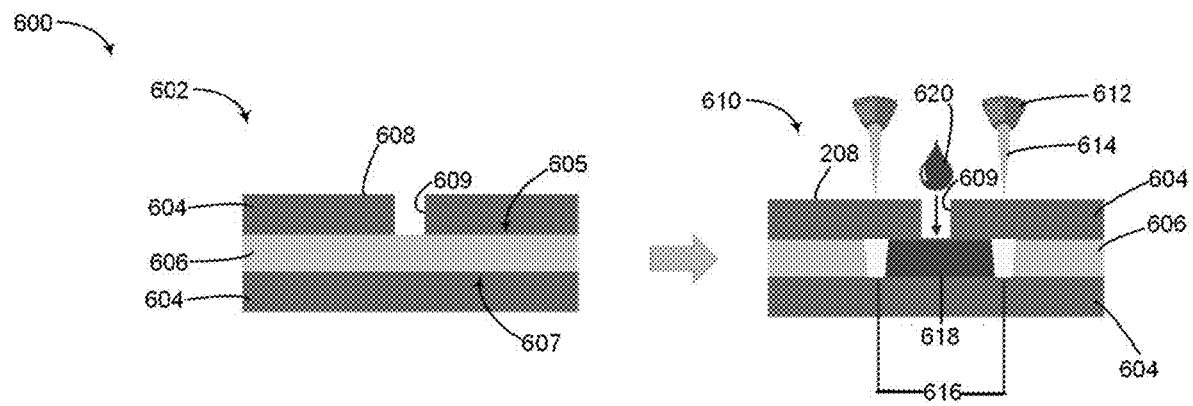
FIG. 6 is a schematic illustration of a second exemplary method for manufacturing a second type of fiber substrate-based fluidic device.

FIGS. 2-14 show various embodiments of fiber substrate-based fluidic devices, methods of manufacturing such device embodiments, and test results from using the devices according to the present disclosure. For example, FIG. 2 is a schematic that shows a method for manufacturing a two-layer, or "open-face," device in which the hydrophilic substrate is not covered on its front side by a hydrophobic film and is only supported by a hydrophobic film on its back side. FIG. 6 is a schematic that shows a method for manufacturing a three-layer, fully enclosed device, wherein the hydrophilic substrate is covered on both (opposite) sides with the hydrophobic film. FIGS. 9, 11A, 12A, and 14 provide schematics illustrating method embodiments for manufacturing devices have more than three layers, such as devices containing two or more hydrophilic substrates. FIGS. 17A-19B show well plate fiber substrate-based fluidic devices that can include some of the same features as the devices shown in FIGS. 2-14 and/or can be manufactured using the same and/or similar methods as those shown in FIGS. 2-14. FIGS. 15A-16B show flow obstructions that can be included in the channels/passageways of the devices to alter the flow rates and/or mixing of fluid samples, such as liquid samples (FIGS. 15A and 16A) and measurements obtained using such embodiments (FIGS. 15B and 16B). FIGS. 20-26B shows the performance of a variety of exemplary fiber substrate-based fluidic device embodiments constructed from different materials.

Exemplary Embodiments of the Disclosed Technology

Figure 1B:
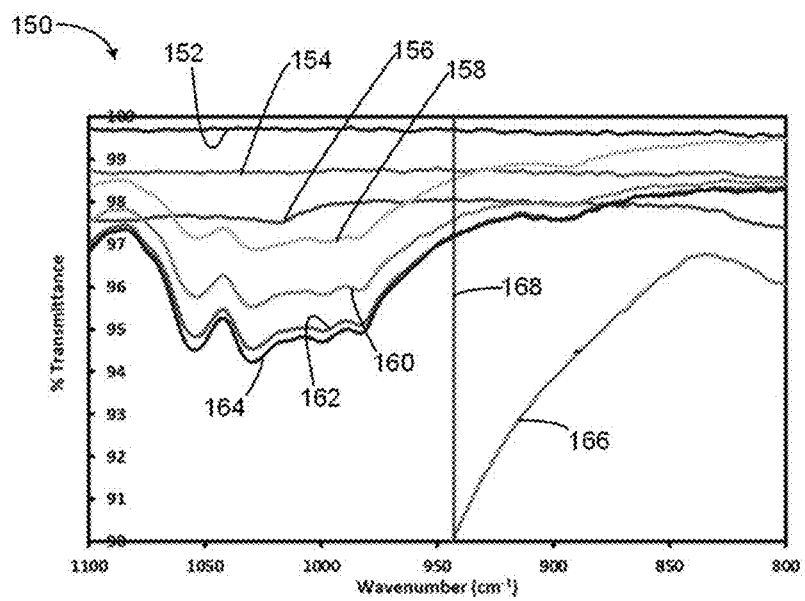
FIG. 1B is a graph illustrating the transparency of other hydrophilic substrates and associated hydrophobic materials to a range of wavenumbers, including an example wavenumber of a carbon dioxide laser.

As described above, the hydrophobic film is substantially transparent to a laser beam. FIG. 1A depicts a graph 100 showing the transparency of a first hydrophilic material 102 (e.g., nitrocellulose) and several hydrophobic films 104, 106, 108, and 110 to a range of wavenumbers. For reference, FIG. 1A also shows the wavenumber of a laser 112, such as a carbon dioxide laser, having a wavenumber of approximately 943 $cm^{-1}$ (e.g., a 10.6 µm laser). The spectra of the hydrophobic films in FIG. 1A include a waxy film 104, a polypropylene and adhesive film 106, a polyethylene and adhesive film 108, and a pure polyethylene film 110 having a thickness of 0.005 inches. FIG. 1B shows the transparency of various other hydrophobic films 152, 154, and 156, as well as various hydrophilic materials 158, 160, 162, 164, and 166 to a range of wavenumbers (expressed as a percent of the incident electromagnetic radiation flux that is transmitted through the material). The hydrophobic films include a first polyethylene film 152 having a thickness of 0.005 inches, a second polyethylene film 154 having a thickness of 0.01 inches, and a polyethylene and adhesive film 156. The hydrophilic materials include a first filter paper 158 having a first pore size, a second filter paper 160 having a second pore size, a third filter paper 162 having a third pore size, a fourth filter paper 164 having a fourth pore size, and a glass microfiber 166. A wavenumber of an example laser 168 is also shown.

Certain properties (e.g., thickness and average pore size) of the exemplary hydrophilic materials shown in FIGS. 1A and 1B are listed below in Table 1. Particular thicknesses of the exemplary hydrophilic materials shown in FIGS. 1A and 1B are listed below in Table 2.

TABLE 1

| No. | Porous substrates | Thickness (mm) | Average pore size (µm) |
|---|---|---|---|
| 102 | Nitrocellulose | 0.12 | 0.45 |
| 158 | Whatman 1 | 0.18 | 11 |
| 160 | Whatman 4 | 0.21 | 20-25 |
| 162 | Whatman 541 | 0.16 | 22 |
| 164 | Whatman 42 | 0.20 | 2.5 |
| 166 | Glass microfiber (GF/A) | 0.26 | 1.6 |

TABLE 2

| No. | Films | Thickness (mm) |
| --- | --- | --- |
| 104 | Waxy film | 0.12 |
| 106 | Polypropylene (PP) + adhesive | 0.06 |
| 108 | Polyethylene (PE) + adhesive | 0.13 |
| 110, 152 | Polyethylene (0.005") | 0.13 |
| 154 | Polyethylene (0.01") | 0.25 |

Although exemplary materials with exemplary thicknesses and/or exemplary pore sizes are listed above, it should be appreciated that materials with different thickness and/or pore sizes also can be used. Further, the exemplary materials described above are not intended to be limiting. For example, other hydrophobic materials can be used that meet the transparency specifications described herein.

Further, although all of the exemplary hydrophobic films discussed above are substantially transparent to the wavenumber of the exemplary laser shown in FIGS. 1A and 1B (e.g., 943 cm$^{-1}$), it should be appreciated that the materials of the hydrophobic film can be selected based on the wavenumber of the laser so that the hydrophobic film is transparent to the laser, such that other laser types can be used. For example, various different lasers can be used having many different wavelengths, so long as radiation produced by the laser passes through the hydrophobic film substantially unattenuated and without compromising the integrity of the hydrophobic film. The laser can have a wavelength of at least 200 nm, at least 300 nm, at least 400 nm, at most 2000 nm, at most 1500 nm, and/or at most 1300 nm, including any ranges including such endpoints (inclusive of the endpoints themselves). As just one example, for a laser having a wavelength 455 nm the hydrophobic film can be constructed from polymethyl methacrylate (PMMA) and/or silicone.

As can be seen from the spectra shown in FIGS. 1A and 1B, polyethylene and polypropylene with and/or without an adhesive, and a wax-polyolefin blend can be used for the hydrophobic film. In some embodiments, polyethylene can be used because it has a relatively high melting point and is thus less likely to be degraded by the laser beam. Further, polyethylene is more rigid than a waxy film, and can therefore be used in some embodiments to provide stronger mechanical support for the hydrophilic substrate. Further, FIGS. 1A and 1B show that adhesives can be used in conjunction with the films without negatively impacting the transparency of the films. Thus, in some embodiments, adhesives can be used to improve the structural integrity of the fiber substrate-based fluidic devices herein.

Figure 1C:
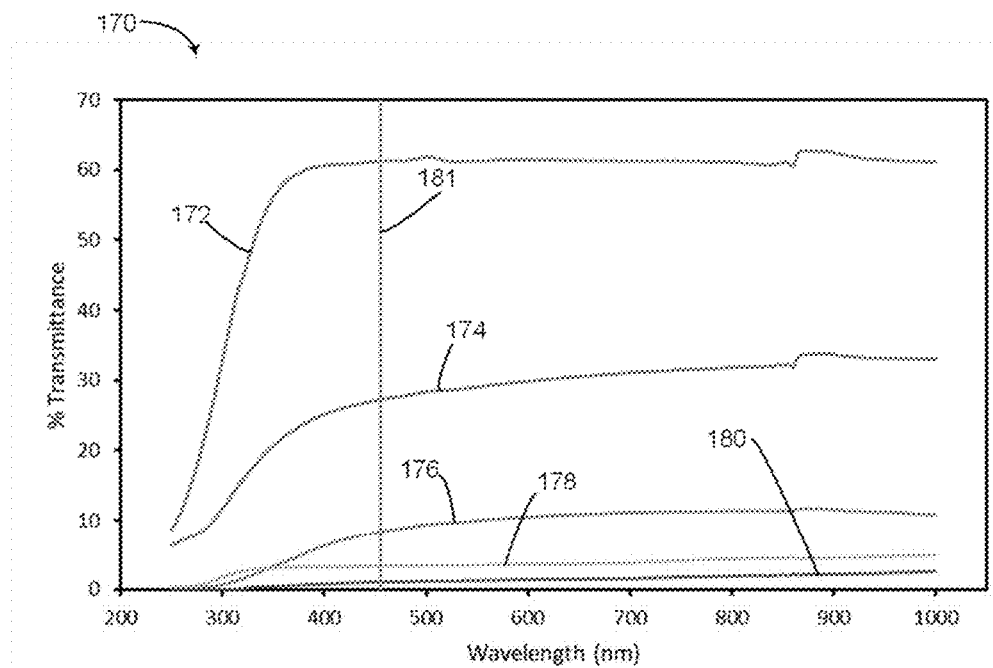
FIG. 1C is a graph illustrating the transparency of various exemplary materials that can be used to form hydrophilic substrates to a range of wavenumbers, including the wavenumber of an example laser that produces a 455 nm laser beam.
Figure 1D:
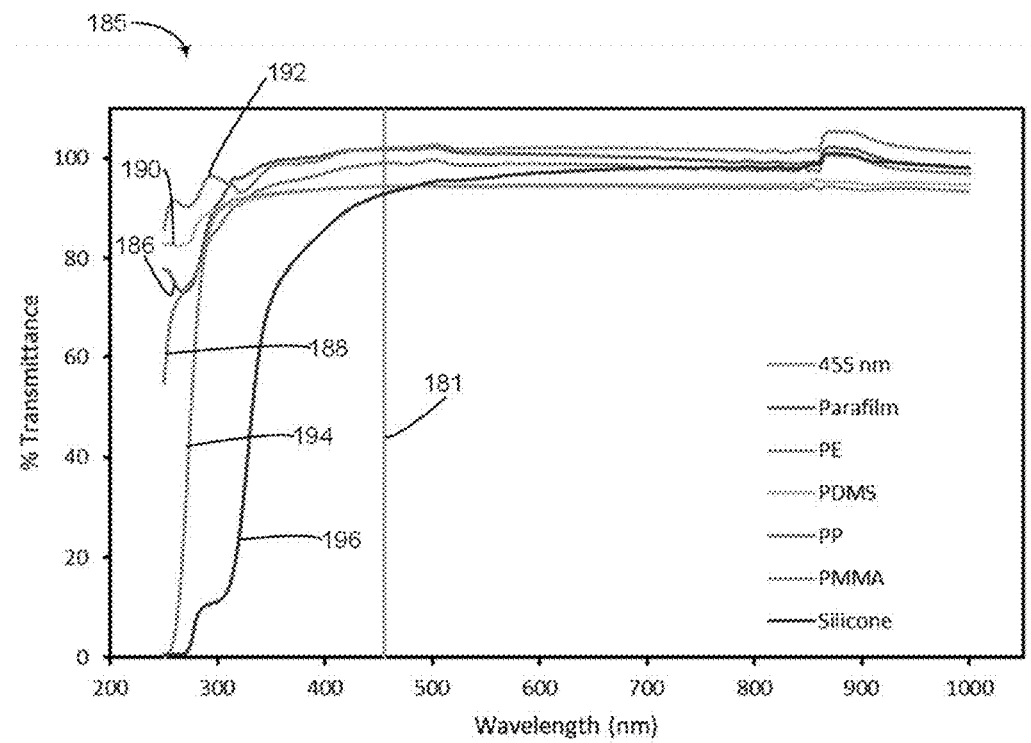
FIG. 1D is a graph illustrating the transparency of various exemplary materials that can be used to form hydrophobic films to a range of wavenumbers, including the wavenumber of an example laser that produces a 455 nm laser beam.

FIGS. 1C and 1D show spectra for other materials that can be used with a laser having a wavelength of 455 nm. Specifically, FIG. 1C shows a graph 170 depicting the transmittance of various hydrophilic materials to a range of wavelengths, and FIG. 1D shows a graph 185 depicting the transmittance of various hydrophobic materials to a range of wavelengths. In FIG. 1C, plot 172 shows the transmittance of a conjugated pad, plot 174 shows the transmittance of a filter paper, plot 176 show the transmittance of a sample pad, plot 178 shows the transmittance of glass microfiber, and plot 180 shows the transmittance of nitrocellulose. The wavelength of the example laser is shown at plot 181. In FIG. 1D, plot 186 shows the transmittance of a wax-polyolefin material, plot 188 shows the transmittance of polyethylene, plot 190 shows the transmittance of polydimethylsiloxane (PDMS), plot 192 shows the transmittance of polypropylene, plot 194 shows the transmittance of polymethyl methacrylate (PMMA or acrylic) and plot 196 shows the transmittance of silicone. As can be seen from FIG. 1D, all of the hydrophobic materials are transparent to at least 80% of the incident electromagnetic radiation for wavelength greater than approximately 400 nm, with most being at least 80% transparent to wavelengths of at least 300 nm.

FIG. 2 shows a first exemplary method 200 for forming a first type of fiber substrate-based fluidic device 208 (e.g., an open channel device that is open on one side and not covered by a hydrophobic film on the open side). At step 202, a hydrophilic substrate 206 and a hydrophobic film 204 are bonded together, such as by using adhesives, lamination, welding, etc. For example, the hydrophilic substrate 206 and the hydrophobic film 204 can be laminated with or without compression and/or can be adhered together with an adhesive, such as an acrylic adhesive. Thus, the hydrophilic substrate 206 can only be covered/supported by the hydrophobic film 204 on one side, leaving the opposite side open/uncovered. In this way, the hydrophobic film 204 can protect the back side of the hydrophilic substrate 206 from contamination and can provide mechanical support to the hydrophilic substrate 206, while the other side of the hydrophilic substrate can be open to the atmosphere, thereby facilitating evaporation, which can be advantageous for assays, such as an immunoassay, that use washing and drying (e.g., of a washing solution) steps. FIGS. 17A-19B, described in more detail below, show open-face well-plate type device embodiments that can be used in such immunoassays.

Next, at step 210, fluid barriers 216 can be formed in the hydrophilic substrate 206 via laser ablation to define the fluid receptacles 218 in the hydrophilic substrate 206 that are configured to retain the fluid sample, such as a liquid sample. Specifically, a laser 212 can be powered and the laser beam 214 it produces can be controlled (e.g., moved), such that the laser beam moves over the hydrophilic substrate 206 and ablates the hydrophilic substrate 206, thereby forming voids in the hydrophilic substrate 206, which can serve as fluid barriers 216 for the fluid receptacles 218. In this way, the fluid barriers 216 can constrain a solution 220 (e.g., a dye and/or a fluid sample containing an analyte of interest) to the fluid receptacles 218 and prevent the fluid from flowing to other portions of the hydrophilic substrate 206. In some examples, the laser can be a carbon dioxide laser and can have a wavelength of at least 8 μm and at most 14 μm. As explained above, other lasers having different wavelengths can be used as well, depending on the materials used for the hydrophobic film 204.

Figure 3A:
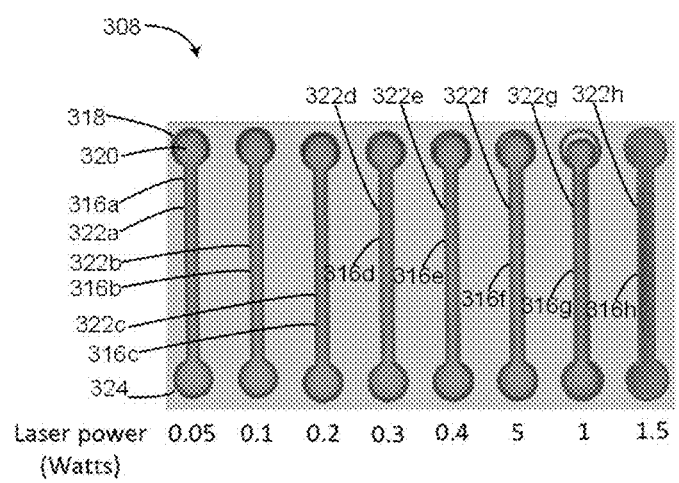
FIG. 3A is an illustration showing exemplary fiber substrate-based fluidic devices of the first type that were manufactured using different laser powers.
Figure 3B:
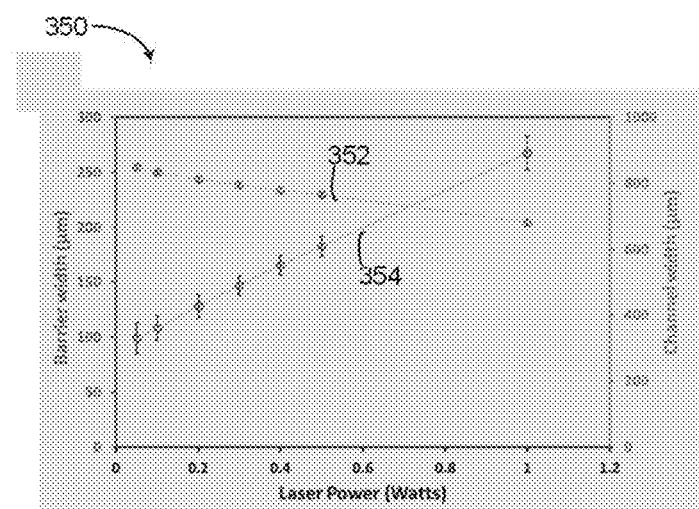
FIG. 3B is a graph illustrating how the fluid barrier width and/or channel width of fiber substrate-based fluidic devices manufactured using one or more of the exemplary methods described herein can vary when using different laser powers.

FIGS. 3A and 3B show how the amount of power produced by the laser can impact the width of a fluid barrier 316 of a fiber substrate-based fluidic device 308 in particular embodiments. In the description herein, the same series reference numbers are used to refer to the same and/or similar components. For example, the fluid barrier 216 of the fiber substrate-based fluidic device 208 can be the same as or similar to fluid barrier 316 of fiber substrate-based fluidic device 308. For conciseness, once introduced and described, similarly numbered components may not be specifically reintroduced or described again in the description herein.

The fluid receptacle 318 of the hydrophilic substrate 206 that contains the fluid sample 320 can include wells 324 and channels 322 that connect two or more of the wells 324. As shown in FIG. 3, the power of the laser can impact the width of the channels 322a, 322b, 322c, 322d, 322e, 322f, 322g, 322h and/or the thickness of the fluid barriers 316a, 316b, 316c, 316d, 316e, 316f, 316g, 3216h. As can be seen in FIG.

Figure 4A:
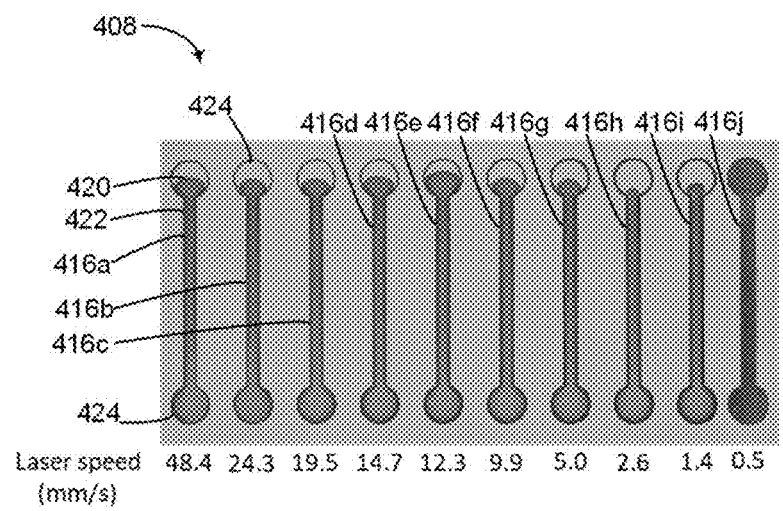
FIG. 4A is an illustration showing fiber substrate-based fluidic devices of the first type that were manufactured using different laser speeds.

3B, increasing the laser power increases the fluid barrier thickness and correspondingly decreases the channel width, resulting in wider fluid barriers and narrower channels. Thus, the thinnest fluid barrier is fluid barrier 316a, while the thickest fluid barrier is fluid barrier 322h, and the fluid barrier thickness monotonically increases as the laser power increases, as shown by plot 354 in FIG. 3B. Correspondingly, the widest channel 322 is channel 322a and the narrowest channel 322 is channel 322h and the channel width monotonically decreases as the laser power increases, as shown by plot 352 in FIG. 3B. As shown in FIG. 4A, excessive laser power (e.g., 1.5 Watts and above) can lead to ablation of the hydrophobic film and may compromise the integrity of the hydrophobic film in particular embodiments. In specific embodiments, such as to obtain the results shown in FIGS. 3A and 3B, the laser speed was held constant (e.g., at 24.3 mm/s).

Figure 4B:
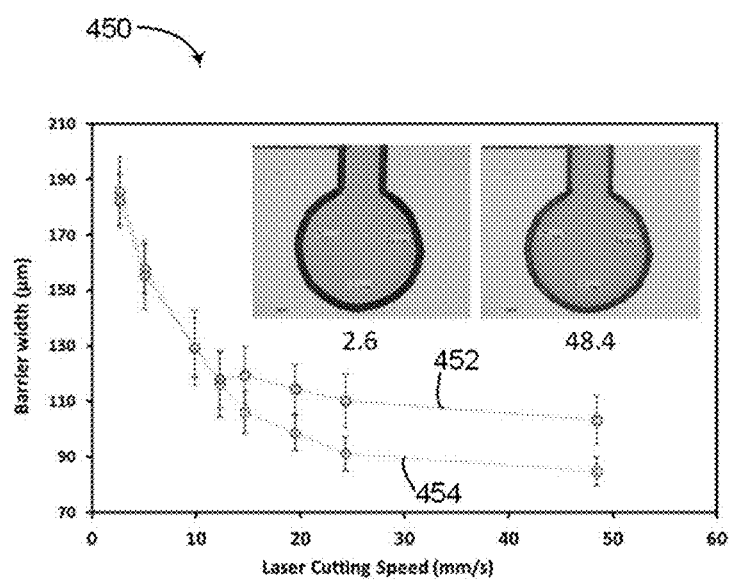
FIG. 4B is a graph illustrating how the fluid barrier width of fiber substrate-based fluidic devices manufactured using one or more of the exemplary methods described herein can vary when using different laser speeds.

As shown in FIGS. 4A and 4B, laser speed (i.e., the speed at which the laser beam is translated over the hydrophilic substrate) also can affect the width of the fluid barriers 416a, 416b, 416c, 416d, 416e, 416f, 416g, 416h, 416i, 416j at the well 424 (as shown by plot 452 in FIG. 4B) and the channel 422 (as shown by plot 454 in FIG. 4B). As can be seen in FIG. 4B, increasing the laser speed while maintaining a fixed laser power decreases the fluid barrier thickness and correspondingly increases the channel width, resulting in thinner fluid barriers and wider channels. Thus, the thinnest fluid barrier in FIG. 4A is fluid barrier 416a, while the thickest fluid barrier is fluid barrier 316j, and the fluid barrier thickness of the well (plot 452) and the channel (plot 454) monotonically increases as laser speed decreases. In some embodiments, excessive laser cutting speeds (e.g., above 12.3 mm/s) may produce nonuniform fluid barrier widths. In the embodiments shown in FIGS. 4A and 4B, the laser power was held constant (e.g., at 0.05 Watts).

FIGS. 5A-5C show how the actual channel width can differ from the designed channel width, and how channel width can affect the flow rates of the fluid 520 in the fiber substrate-based fluidic device 508. To obtain the results shown in FIGS. 5A-5C, the laser power was held constant (e.g., at 0.05 Watts) and the laser speed was held constant (e.g., at 12.3 mm/s). As shown in FIG. 5C by plot 552, the actual channel width obtained from ablating the hydrophilic substrate with the laser substantially matches the designed channel width, demonstrating that the methods described herein can produce reliable and consistent fluid receptacles 518 and fluid barriers 516. As shown in FIG. 5A, the flow rates of the fluid 520 increase as the width of the channels 522 increases. Thus, the slowest fluid flow is for channel 522a while the fastest fluid flow is for channel 522h, and the fluid flow monotonically increases as channel width increases, as shown in FIG. 5A.

While FIGS. 3A-5C and other figures described herein show test results for specific fiber substrate-based fluidic devices, it should be appreciated that the desired laser cutting speeds, laser powers, and channel widths can be modified depending on the desired dimensions and/or compositions of the hydrophilic substrate and/or the hydrophobic film. In some embodiments, the materials selected for the hydrophilic substrate and/or the hydrophobic film and/or the thicknesses of these materials can affect the desired laser and/or laser operating parameters. For example, thicker hydrophobic films may allow less of the laser beam through to the hydrophilic substrate. Thus, the laser itself (e.g., the laser wavelength) and/or the operating parameters of the laser can be selected based on the materials the fiber substrate-based fluidic device is constructed from, and/or based on the dimensions (e.g., thicknesses) of these materials. Additionally, or alternatively, the materials and/or the thicknesses of these materials can be selected based on the given laser and/or laser operating parameters. For example, thicker hydrophobic films can be selected when operating the laser at higher power and/or slower speeds. Thus, the materials used to form the fiber substrate-based fluidic devices disclosed here, the dimensions (e.g., thicknesses) of these materials, the laser, and the laser operating parameters (e.g., laser power and laser speed) can each be independently adjusted to ensure that the laser selectively ablates only the hydrophilic substrate and not the hydrophobic film.

FIG. 6 shows a second exemplary method 600 for forming a second type of fiber substrate-based fluidic device 608 (e.g., an enclosed device that is wrapped/covered on opposite sides by a hydrophobic film). In such examples, reagents can be included in the device 608 and can be trapped on and/or within the hydrophilic substrate 606 with the hydrophobic film 604 separating the hydrophilic substrate 606 from the atmosphere. This facilitates isolating all reagents and can prevent evaporative loss of wetted components, wetting agents, and the like. Such embodiments may be useful in applications that are sensitive to moisture and evaporation of standards and reagents, such as chromatography methods.

Initially, at step 602, the hydrophilic substrate 606 can be sandwiched between two layers of hydrophobic film 608 and bonded to the two layers of hydrophobic film 604. That is, a first layer of the hydrophobic film 608 that includes pre-cut openings 609 can be positioned on a first side 605 of the hydrophilic substrate 606 and a second layer of the hydrophobic film 604 can be positioned on an opposite second side 607 of the hydrophilic substrate 606. The pre-cut openings 609 can be formed separately using any suitable means, such as one or more of a laser, a die, a plotting cutter, etc. In some examples, the two layers of film 604 can be positioned on either side of the hydrophilic substrate 606 and then bonded to the hydrophilic substrate 606 at substantially the same time. In other examples, the layers can be positioned on and bonded to the hydrophilic substrate at different times and/or stages.

As with the first exemplary method 200, once the layers of device 608 have been assembled and bonded together, the fluid barriers 616 can then be formed in the hydrophilic substrate 606 at step 610. As discussed above, because the hydrophobic film 604 has a relatively high flash point and is substantially transparent to the laser beam 614, the laser beam 614 can pass through the top layer of the hydrophobic film 604 and ablate the hydrophilic substrate 606 without compromising the integrity of the hydrophobic film 604.

The hydrophilic substrates disclosed herein can have a relatively low flash point (e.g., 13° C.), and thus, can be configured to be ablated by the laser beam 614, whereas the hydrophobic film 604 can have a relatively high flash point (e.g., at least 300° C.) and thus is not ablated by the laser beam. For example, the hydrophilic substrates disclosed herein can have a flash point of at least 5° C., at least 10° C., at least 15° C., at least 20° C., at least 40° C., at most 200° C. at most 150° C., at most 100° C., at most 80° C., at most 60° C., and/or at most 40° C., including any ranges including such endpoints (inclusive of the endpoints themselves). The hydrophobic films disclosed herein can have a flash point of at least 500° C., at least 400° C., at least 300° C., or at least 200° C. Further, the hydrophobic films disclosed herein can have a melting point of at least at least 20° C., at least 40° C., at least 60° C., at least 80° C., at least 100° C., at least 120° C., at most 220° C., at most 180° C., at most 140° C., and/or at most 100° C., including any ranges including such endpoints (inclusive of the endpoints themselves). In this way, the hydrophobic films can be configured to melt during the ablation process, in some embodiments. As such, the laser ablation can weld/fuse different layers of the hydrophobic films together when ablating the hydrophilic substrate, thereby forming and/or reinforcing the fluid barriers 616. Thus, any voids (e.g., air pockets) formed in the hydrophilic substrate 606 by the laser ablation and/or the hydrophobic films 604 themselves can form the fluid barriers 616. Together, these voids and/or the hydrophobic films 604 can enclose and fluidly seal the fluid receptacles 618 of the hydrophilic substrate 606. Thus, in some embodiments, the only openings in the fluid receptacles 618 where liquid can move into and/or out of the fluid receptacles 618, can be at the pre-cut openings 609 in the top layer of the hydrophobic film 604.

As explained above, because the laser beam can pass through the hydrophobic film 604, the fluid barriers 616 can be formed after assembling the fiber substrate-based fluidic device 608 (e.g., after sandwiching the hydrophilic substrate 606 between two layers of hydrophobic film 604 and bonding these three layers together), thereby simplifying the manufacturing process. In some embodiments, reagents can be deposited to the device 608 after the device fabrication through the pre-cut holes 609.

Figure 7:
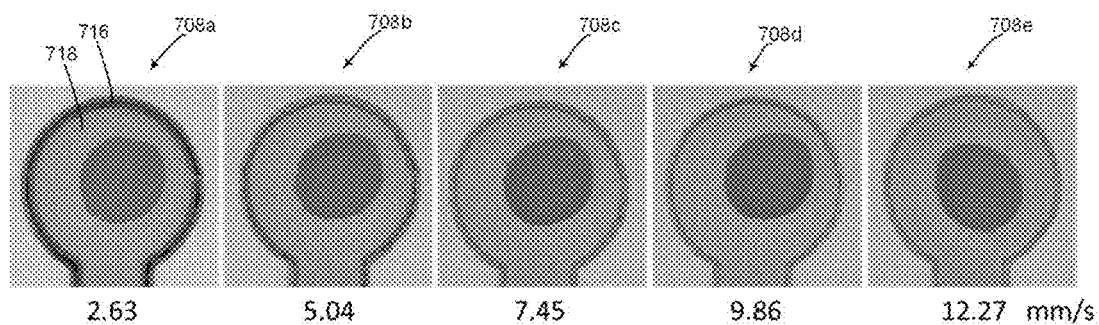
FIG. 7 is an illustration showing fiber substrate-based fluidic devices of the second type that were manufactured using different laser speeds.

Similar to FIG. 4A, FIG. 7 shows how laser speed can affect the width of the fluid barriers 716. As shown in FIG. 7, slower laser cutting speeds can provide thicker fluid barriers, but also can expose the hydrophobic film to more electromagnetic radiation, and can, in some embodiments, increase the risk of damage to the hydrophobic film. At a laser speed of 12.27 mm/s, the laser beam ablated the hydrophilic substrate and formed sufficiently thick fluid barriers 716 without ablating or otherwise compromising the integrity of the hydrophobic film. Table 3 shows some example laser power and laser cutting speeds for various hydrophobic films.

show close-up top views of specific portions of the fiber substrate-based fluidic devices 808, the lowermost photographs show cross-sectional views of the fiber substrate-based fluidic device 808 and the middle photographs show top views of the entire dumbbell-shaped fiber substrate-based fluidic devices 808.

FIG. 9 shows a third exemplary method 900 for forming a composite fiber substrate-based fluidic device 930 from two or more fiber substrate-based fluidic devices 908. The composite fiber substrate-based fluidic device 930 can be modular, such that multiple fully formed fiber substrate-based fluidic devices 908 can be stacked and bonded together as desired to form the composite fiber substrate-based fluidic device 930. In this way, the composite fiber substrate-based fluidic device 930 can be tailored to meet any desired needs by selecting from various fully formed fiber substrate-based fluidic devices 908.

Like in the first exemplary method 200, two or more fiber substrate-based fluidic devices 908 of the first type (e.g., open-face devices) can be initially formed at step 902 by bonding a hydrophobic film 904 to each of the hydrophilic substrates 906. Then, at step 910, each of the hydrophilic substrates 906 can be separately ablated with a laser (not shown in FIG. 9). Then, at step 940, the separate and fully formed fiber substrate-based fluidic devices can be stacked and bonded together to form the composite fiber substrate-based fluidic device 930 and a fluid 920 can be dispensed into the fluid receptacles 918 via the opening 909 in the top layer of hydrophobic film 904.

As one example, the fiber substrate-based fluidic devices 908 can be bonded together using a thermal laminator. The applied heat and pressure from the thermal laminator can be sufficient to permanently couple the fiber substrate-based fluidic devices 908 in the stack. The hydrophobic film 904 not only acts as a fluid barrier to separate fluid receptacles 916 in different layers of hydrophilic substrate 906, but also can act as an adhesive to couple each device 908. As shown in FIGS. 10A and 10B, the fluid receptacles 1016 in in each

TABLE 3

| Materials | | | Cutting parameters | | | | | |
|---|---|---|---|---|---|---|---|---|
| Top | Middle | Bottom | Power (Watts) | Speed (mm/s) | Focal Point (mm) | Pulses per inch | Channel width (μm) | Barrier width (μm) |
| Waxy film | Nitrocellulose | Waxy film | 0.25 | 11.34 | 1.30 | 650 | 1896 ± 14 | 82 ± 11 |
| PP + adhesive | Nitrocellulose | PP + adhesive | 0.05 | 7.45 | 0.70 | 400 | 1913 ± 12 | 71 ± 11 |
| PE + adhesive | Nitrocellulose | PE + adhesive | 0.10 | 6.49 | 1.30 | 290 | 1843 ± 10 | 57 ± 6 |
| PE (0.005") | Nitrocellulose | PE (0.005") | 0.1 | 12.27 | 1.20 | 300 | 1862 ± 15 | 140 ± 9 |

Figure 8:
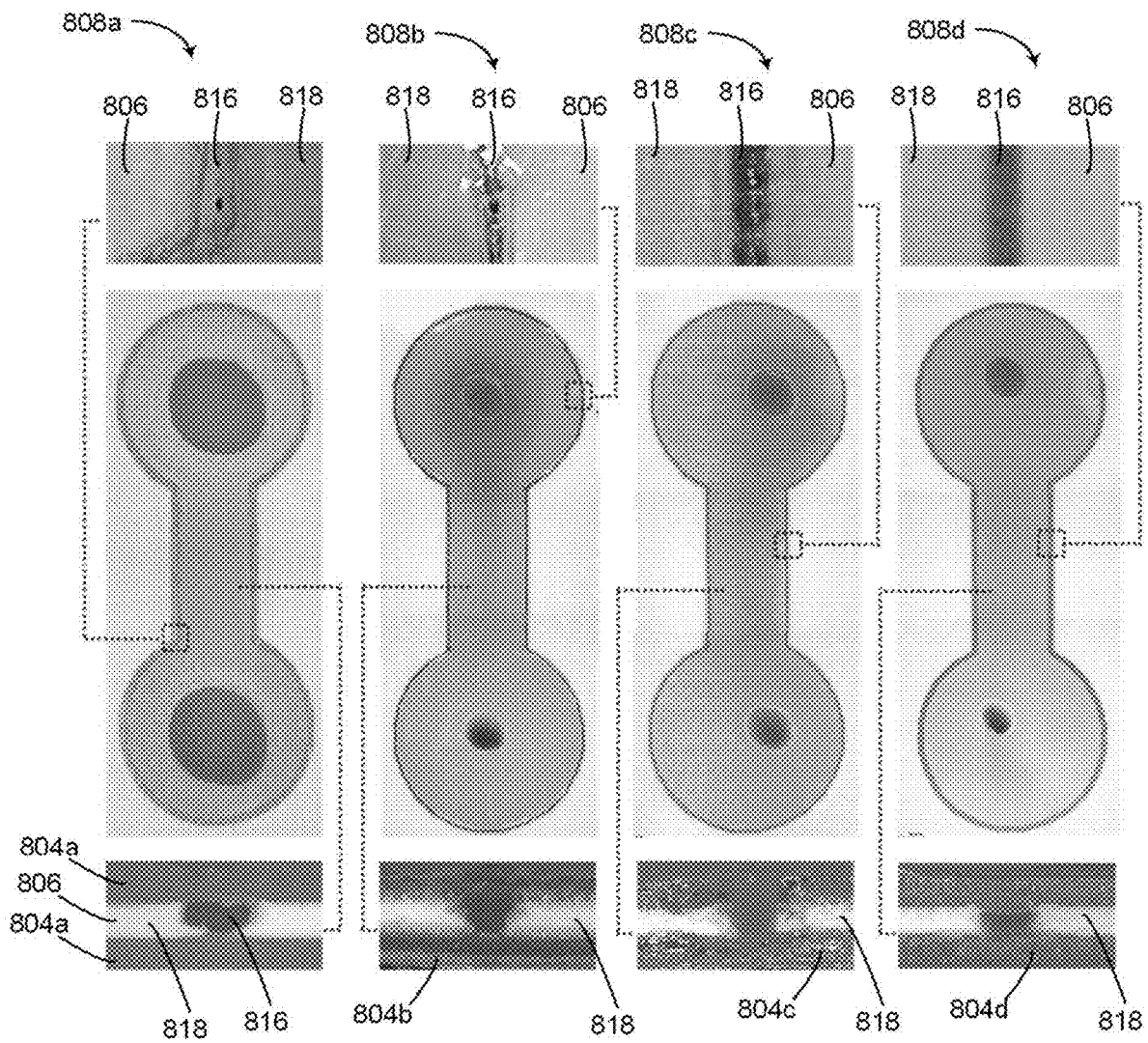
FIG. 8 shows images of fiber substrate-based fluidic devices of the second type that are constructed from different hydrophobic materials.

FIG. 8 shows photographs of fiber substrate-based fluidic devices 808a, 808b, 808c, and 808d, which were manufactured using the second exemplary method 600 and the example laser operating parameters shown above in Table 3. The hydrophobic film 804a of the device 808a was constructed from the waxy film of Table 3, the hydrophobic film 804b of the device 808b was constructed from the polypropylene and adhesive film of Table 3, the hydrophobic film 804c of the device 808c was constructed from the polyethylene and adhesive film of Table 3, and the hydrophobic film 804d of the device 808d was constructed from the polyethylene film of Table 4. The uppermost photographs in FIG. 8 of the devices 1008a, 1008b, and 1008c can be shaped differently to create different flow patterns in each of the hydrophilic layers. For example, in FIGS. 10A and 10B, the fluid receptacle 1016 of the uppermost hydrophilic substrate can be a single circular well positioned substantially in the middle of the hydrophilic substrate 906. The middle hydrophilic substrate can include a fluid receptacle 1016 that is substantially X-shaped, with channels 1022 that can distribute fluid from a central well 1024 to four outer wells 1024. The bottom-most hydrophilic substrate can include four substantially circular wells 1024 that receive fluid from the outer wells 1024 of the middle hydrophilic substrate.

Although the device 930 is shown as including three fiber substrate-based fluidic devices 930, more or less than three device 908 can be included. For example, the device 930 can include four, five, six, seven, eight, nine, and/or ten or more fiber substrate-based fluidic devices 908 stacked together. Further, the patterns and/or shapes of the fluid receptacles 1016 of each of the hydrophilic layers can be altered as desired.

FIG. 11A shows a fourth exemplary method 1100 for forming another type of multi-layer fiber substrate-based fluidic device 1130. Rather than separately forming and then stacking individual open-face devices like in the third exemplary method 900, the entire stack of hydrophobic films 1104a, 1104b, and 1104c and hydrophilic substrates 1106a, 1106b are stacked and laminated at step 1102. The hydrophobic films 1104 and the hydrophilic substrates 1106 can be arranged in an alternating order such that each hydrophilic substrate 1106 is sandwiched between two layers of hydrophobic films 1104. In some examples, the device 1130 can include five total layers: three layers of hydrophobic films 1104 and two layers of hydrophilic substrates 1106. However, in other examples, more or fewer than three layers of hydrophobic films 1104 and/or two layers of hydrophilic substrates can be included. For example, the device 1130 can include seven, nine, eleven, thirteen, and/or more layers. The top two hydrophobic layers 1104a and 1004b can be pre-cut with openings 1109. In some examples, the same type of materials can be used for all of the hydrophobic layers and/or all of the hydrophilic layers. In other examples, different materials can be used for different layers. For example, in the example of FIG. 11A, the top and bottom hydrophobic films 1104a, 1104c comprise a first type of material (e.g., polyethylene), while the middle hydrophobic film 1104b comprises a second type of material (e.g., a wax-polyolefin blend). Utilizing different materials for the hydrophobic films 1104 can facilitate different device embodiments. For example, using a film in the middle layer that is less transparent to the laser than the outer layers (e.g., one that absorbs more of the laser beam's energy than the outer layers, such as 1104a, 1104c) can help prevent the laser beam from passing through the middle hydrophobic film and unintentionally ablating the hydrophilic substrate on the other side of the middle layer, opposite the laser beam.

The lamination process in step 1102 can include exposing the device 1130 to at least a threshold temperature (e.g., 120° C.), exposing the device 1130 to at least a threshold pressure (e.g., 120 PSI), utilizing an adhesive (e.g., acrylic adhesive), and/or exposing the device 1130 to the threshold temperature and/or threshold pressure for a threshold duration (e.g., 40 seconds).

Unlike the previously described methods, the laser ablation in the fourth exemplary method 1110 can be accomplished in two discrete steps. For example, at step 1110a, laser beam(s) 1114 can be directed from a first side 1111 of the device 1130 through the first hydrophobic film 1104a to ablate the first hydrophilic substrate 1106a and then the laser beam(s) 1114 can be directed through the opposite second side 1113 of the device 1130 and through the third hydrophobic film 1104c to ablate the second hydrophilic substrate 1106b. For example, the device 1130 can be turned/flipped over after the first hydrophilic substrate 1106a is ablated so that the third hydrophobic film 1104c faces the laser(s) 1112. However, in other examples, the order can be reversed and the second hydrophilic substrate 1106b can be ablated before the first hydrophilic substrate 1106a. In yet further examples, the ablating can all be performed in one step, such as if lasers are included on both sides of the device 1130 and the laser beams are directed through the hydrophobic films 1104a and 1104c substantially simultaneously.

Further, the device 1130 can include two separate and discrete fluid receptacles 1118a, 1118b. As shown in FIGS. 11A and 11B, the first fluid receptacle 1118a can be limited to only the first hydrophilic substrate 1106a, whereas the second fluid receptacle 1118b can be connected to both hydrophilic substrates 1106a, 1106b. In step 1140, a first fluid 1120a can be dispensed into the first receptacle 1118a and a second fluid 1120b can be dispensed into the second fluid receptacle 1118b. The fluids 1120a, 1120b can be the same or different.

FIG. 11B shows top and bottom views of the device 1130 on the right and cross-sectional views on the left, taken along the cutting planes shown in the top view on the right. In this way, the device 1130 can include two different fluid receptacles that are fluidly sealed from one another (e.g., such that there is no mixing there-between), and thus, two different flow patterns. In some examples, two different fluids 1120a, 1120b can be utilized, one for each of the fluid receptacles 1118a, 1118b.

Example laser cutting parameters for fabricating devices utilizing the fourth exemplary method 1100 are listed below in Table 4.

TABLE 4

| Materials | | | | | Cutting parameters | | | | |
| --- | --- | --- | --- | --- | --- | --- | --- | --- | --- |
| 1$^{st}$ Layer | 2$^{nd}$ Layer | 3$^{rd}$ Layer | 4$^{th}$ Layer | 5$^{th}$ Layer | Power (Watts) | Speed (mm/s) | Focal point (mm) | Pulses per inch | Function |
| PE (0.005") | Nitrocellulose | PE (0.005") | Nitrocellulose | PE (0.005") | N/A | | | | |
| PE (0.005") | Nitrocellulose | Waxy film | Nitrocellulose | PE (0.005") | 0.1 | 12.27 | 3.0 | 300 | Passive 3D flow |
| PE + adhesive | Nitrocellulose | Waxy film | Nitrocellulose | PE + adhesive | 0.1 | 6.49 | 1.6 | 290 | Compression-activated 3D flow |

Figures 12A, 12B:
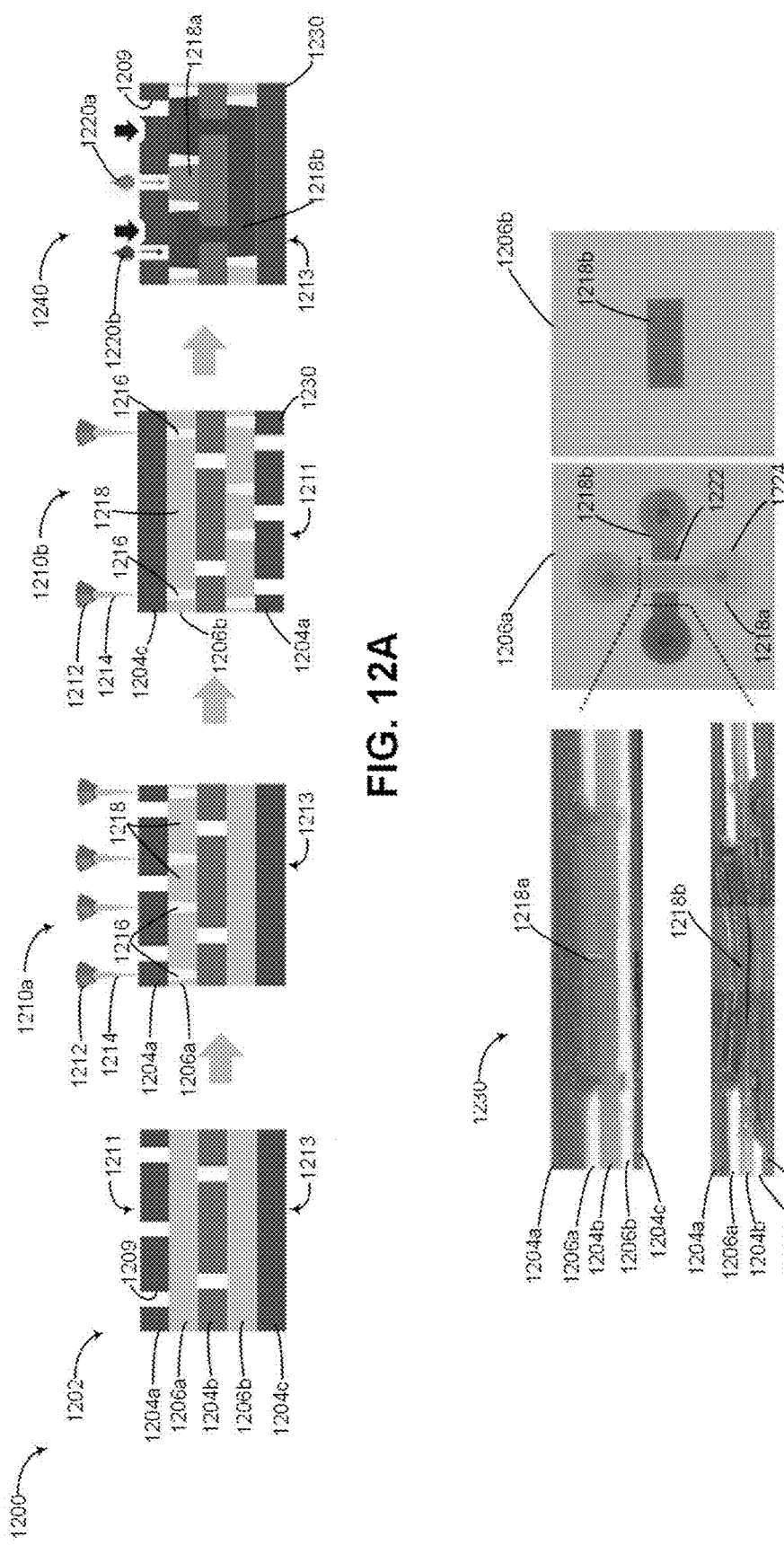
FIG. 12A is a schematic illustration of fifth exemplary method for manufacturing a fifth type of fiber substrate-based fluidic device.
FIG. 12B illustrates cross-sectional, top, and bottom views of an exemplary fifth type of fiber substrate-based fluidic device.

FIG. 12A shows a fifth exemplary method 1200 for forming another exemplary multi-layer fiber substrate-based fluidic device 1230. Composite fiber substrate-based fluidic device 1230 is the same and/or similar to composite fiber substrate-based fluidic device 1130, except that composite fiber substrate-based fluidic device 1230 may be pressure activated. Thus, the fifth exemplary method 1200 may be the same as the fourth exemplary method 1100 except that the fifth exemplary method 1200 may include the final step of compressing the composite fiber substrate-based fluidic device 1230 (e.g., with a pipette tip) to facilitate fluid flow.

In some examples, the composite fiber substrate-based fluidic device 1230 also may be constructed from different materials than the composite fiber substrate-based fluidic device 1130 (e.g., a polyethylene with adhesive film rather than a pure polyethylene film).

The fiber substrate-based fluidic device 1230 may prohibit fluid flow unless activated with a compression force. In this way, the composite fiber substrate-based fluidic device 1230 can act like a one-way gate valve that can be selectively controlled (by selectively applying a compressive force thereto) to regulate the flow of fluid through the device as desired. FIG. 12B shows similar images of the device 1230 as FIG. 11B shows of device 1130.

FIGS. 13A and 13B show yet another exemplary multilayer fiber substrate-based fluidic device 1330. Device 1330 is the same as and/or similar to the devices 1130 and 1230 except that the fluid receptacles 1318 and flow patterns are slightly different. As shown in FIG. 13B, the first hydrophilic substrate 1306a comprises crisscrossing fluid receptacles 1318a, 1318b having relatively long, undulating channels. The second hydrophobic film 1304b includes a plurality of small openings 1309b that connect the fluid receptacles 1318a, 1318b to a plurality of rectangular wells 1324 in the second hydrophilic substrate 1306b. A sixth exemplary method 1440 for manufacturing device the 1330 is shown in FIG. 14. As with the fourth and fifth exemplary methods, a sixth exemplary method 1440 is shown in FIG. 14 for manufacturing device 1330 includes bonding the layers in a stack at step 1402, and then ablating the two hydrophilic substrates 1306a, 1306b, in two subsequent steps 1410a, 1410b.

Figure 15A:
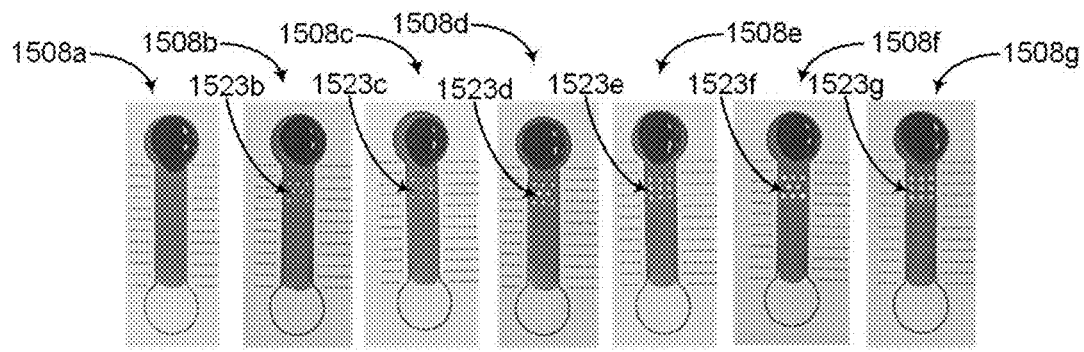
FIG. 15A illustrates fiber substrate-based fluidic devices manufactured using one or more of the exemplary methods described herein having different sized and patterned flow obstructions.
Figure 15B:
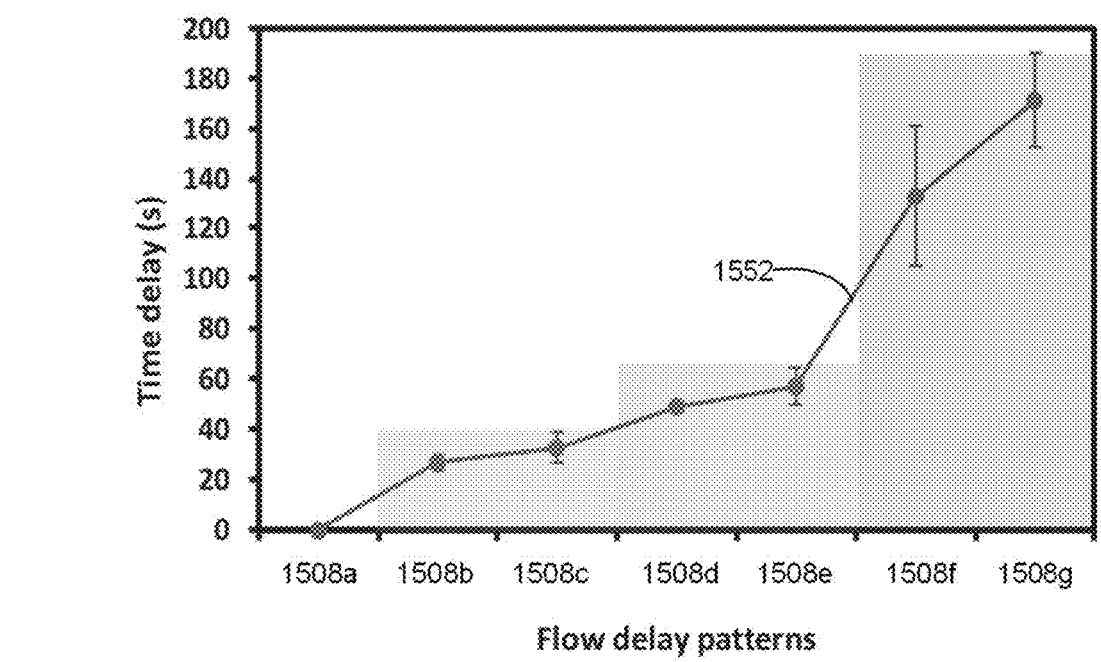
FIG. 15B is a graph illustrating how the size and pattern of flow obstructions in the channels of exemplary fiber substrate-based fluidic devices can affect the rate of fluid flow through the channels.

FIGS. 15A-16B show flow obstructions 1523 (FIG. 15A), 1623 (FIG. 16A) that can be included in the channels of the fluid receptacles of the fiber substrate-based fluidic devices disclosed herein to promote mixing of the fluid sample (FIGS. 15A and 16A), and mixing results obtained using such embodiments (FIGS. 15B and 16B). Each of the flow obstructions 1523, 1623 can be formed by precisely ablating the hydrophilic substrate with the laser beam, such as by focusing the laser beam on a specific point in the hydrophilic substrate without moving the laser beam. FIGS. 15A and 15B show how the arrangement and size of the flow obstructions 1523b, 1523c, 1523d, 1523e, 1523f, 1523g can affect fluid flow and mixing. The flow obstructions can be formed as micropillar structures in the channels of the devices 1508b, 1508c, 1508d, 1508e, 1508f, 1508g, 1508g. Device 1508a has no flow obstructions. Devices 1508b and 1508c have flow obstructions of the same size/diameter (e.g., 300 μm) but are arranged in different patterns. Similarly, devices 1508d and 1508e have flow obstructions of the same size/diameter (e.g., 400 μm) but are arranged in different patterns, and devices 1508f and 1508g have flow obstructions of the same size/diameter (e.g., 500 μm) but are arranged in different patterns. The time it took for red dye solution from one end of the devices to the other are shown in plot 1552 in FIG. 15B. Increasing the flow obstruction diameter reduces the speed (increases the delay) while arranging the flow obstructions in parallel (1523c, 1523e, 1523g) reduced flow speed (resulting in slightly increased time delays) compared to the alternating pattern (1523b, 1523d, 1223f).

FIGS. 16A and 16B show Y-shaped fiber substrate-based fluidic devices having flow obstructions 1623 of uniform diameter. However, the number of flow obstructions was varied between the devices 1608a, 1608b, 1608c, 1608d to demonstrate how increasing the number of obstructions enhances mixing as shown by graph 1650a, 1650b, 1650c, and 1650d. Specifically, red and yellow dye solutions were simultaneously applied to the different inlets of the Y-shaped device using a multichannel pipette. Mixing of the dyes at the end of each device were captured and the grey color intensity profiles across the channel width were analyzed using software (FIG. 16B). As shown by graph 1650d, the device 1608d with the highest number of flow obstructions 1623d demonstrated the best mixing, as demonstrated by its plot in graph 1650d being closest to the dashed line representing 100% mixing efficiency.

FIGS. 17A-19B show how the methods described above can be used to manufacture well-plate type fiber substrate-based fluidic devices 1708a, 1708b, 1708c, and 1708d, 1808, and 1908 having a plurality of wells 1724, 1824, and 1924, respectively (e.g., 96 wells, 1536 wells, 3456 wells, etc.). The well-plate type fiber substrate-based fluidic devices can be useful in dot-immunobinding assays (DIA), such as to perform qualitative analysis.

Conventional immunoassays require large volumes (20-200 μL) of samples and reagents and take a long time (typically more than one hour for each incubation and blocking step). The well-plate type fiber substrate-based fluidic devices disclosed herein provide higher surface-to-volume ratio of the hydrophilic substrate relative to the plastic substrates and provide less sample and reagent consumption, less analysis time, and higher sensitivity. Further, unlike some conventional paper-based well plates where the paper must be suspended in air to prevent the reagent solutions from wicking through the assay zones while performing the assay, the hydrophobic films of the present disclosure provide mechanical support for the hydrophilic substrate. Thus, the devices will not leak when placed on a flat surface, which makes the assays easier to handle, protects the assay from contamination, and prevents mixing of solution between the assay zones. Moreover, the flexibility of the fabrication method allows for tailor made microfluidic designs for the particular assay performed on the well plate, not only limited to the standard well plate format. For example, the wells can be connected which can be used to carry reagents between zones, mixing or disposing solution to waste regions showing potential for simultaneous and automated analysis on a plate device.

FIGS. 18A-19B show an example of the devices 1808 (FIG. 18A) and 1908 (FIG. 19A) being used to perform an immunoglobulin bioassay. The hydrophilic substrate of the present disclosure provides strong physical adsorption of an immunoglobulin or antibody (e.g., rabbit immunoglobulin G) without the need of surface modification. As shown in FIGS. 18A and 18B, each well 1824 can comprise an assay zone 1860 surrounded by a waste zone 1862. The immunoassay shown in FIGS. 18A and 18B was performed in the assay zone 1860 and the excess reagents and non-specific binders were laterally washed to the waste zone 1862. The washing step was evaluated using red dye solution. The deposited dye was entirely washed to the waste zone 1862 indicating efficiency of the lateral flow washing.

FIG. 19A shows a method 1900 for performing the immunoassay. At step 1910, an immunoglobulin or antibody-containing solution can be immobilized in the assay zone of the well 1906. Then, at step 1912, the assay can be fried for a duration (e.g., 10 minutes), such as at room temperature. At step 1914, non-specific binding sites in the assay zone can be blocked using, for example, a blocking buffer, a surfactant, and a serum protein 1913 (e.g., bovine serum albumin) and can then be air-dried for a duration (e.g., 10 minutes), such as at room temperature in step 1916. At step 1918, a solution containing an anti-antibody conjugated with a fluorescent signaling molecule 1917 (e.g., goat antirabbit IgG conjugated fluorescein isothiocyanate) can be prepared in an incubation buffer (e.g., a phosphate buffer saline containing a surfactant), added to the assay, and allowed to incubate for a duration (e.g., two minutes). Each assay zone can then be washed with a buffer solution (e.g., phosphate buffer saline). Then, at step 1920 the device can be exposed to a threshold temperature (e.g., 30° C.) for a threshold duration (e.g., 30 min) for drying and then fluorescence measurements can be taken at step 1922. For example, fluorescent measurements can be taken at, for example, excitation wavelength 490 nm and emission wavelength 520 nm using a plate reader. As shown in the exemplary results summarized by FIG. 19B, the above procedure produces a strong correlation between fluorescent intensities and immunoglobulin concentrations, demonstrating that the method 1900 for performing the immunoassay works well.

Figures 20, 21:
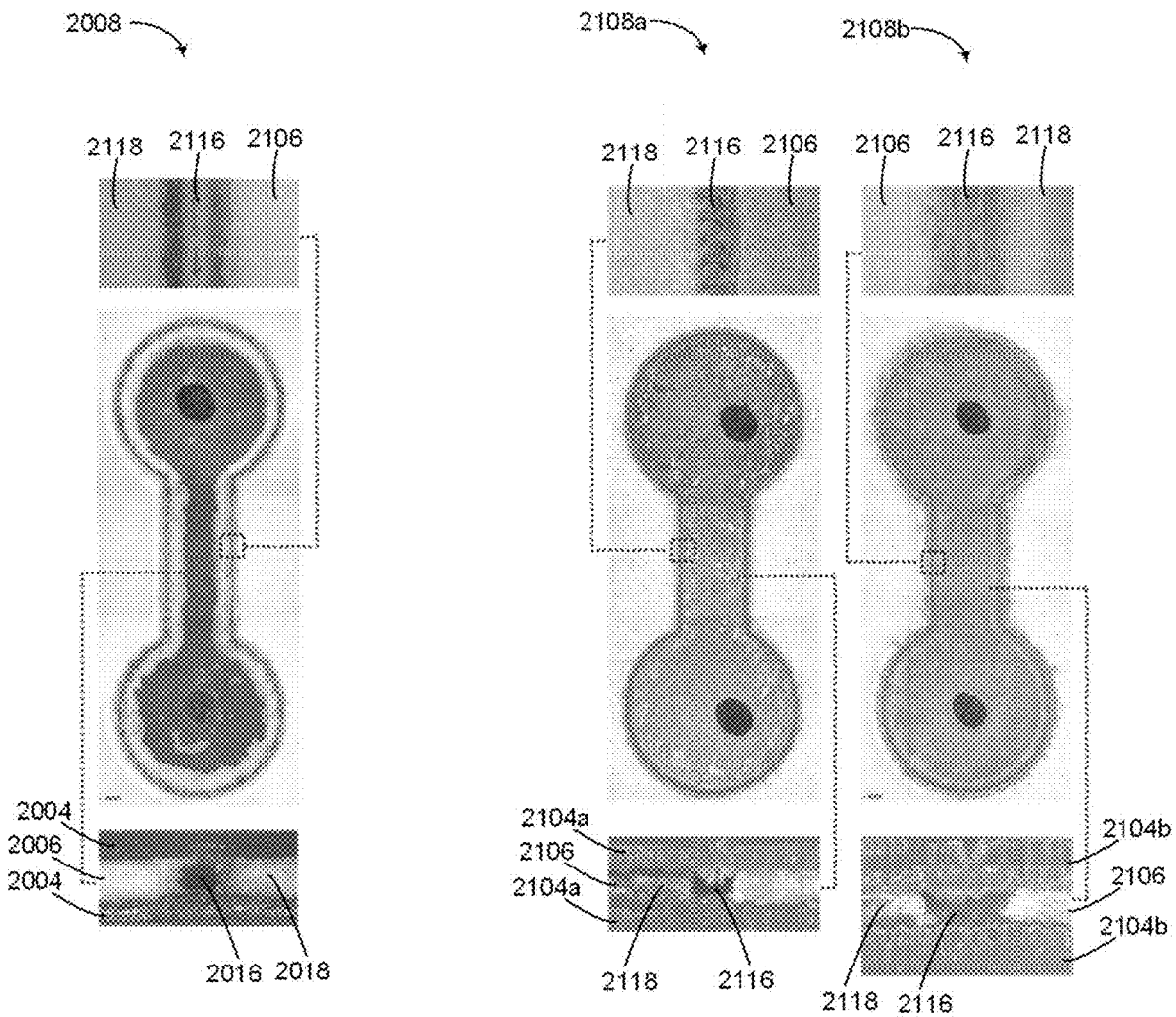
FIG. 20 is an image of an exemplary fiber substrate-based fluidic devices having a second type of hydrophilic substrate.
FIG. 21 illustrates exemplary fiber substrate-based fluidic devices having a third type of hydrophilic substrate and having hydrophobic films of different thicknesses.

FIGS. 20-24 show various fiber substrate-based fluidic devices manufactured according to one or more of the methods disclosed herein that are constructed from different materials. FIGS. 20-24 show images of actual devices to illustrate how the different materials can impact the performance of the devices. For example, FIG. 20 shows a device 2008 comprising a hydrophilic substrate 2006 constructed from a glass microfiber and a hydrophobic film 2004 constructed from polyethylene. Similar to FIG. 8, FIGS. 20-24 show top views, top close-up views, and cross-sectional views of the fiber substrate-based fluidic devices.

FIG. 21 shows a device 2108*a* comprising a hydrophilic substrate 2106 constructed from a filter paper (e.g., Whatman 541) and a hydrophobic film 2104*a* constructed from polyethylene having a thickness of 0.005 inches and also shows a device 2108*b* comprising a hydrophilic substrate 2106 constructed from the same filter paper (e.g., Whatman 541) and a hydrophobic film 2104*b* constructed from polyethylene but having a thickness of 0.01 inches.

Figure 22:
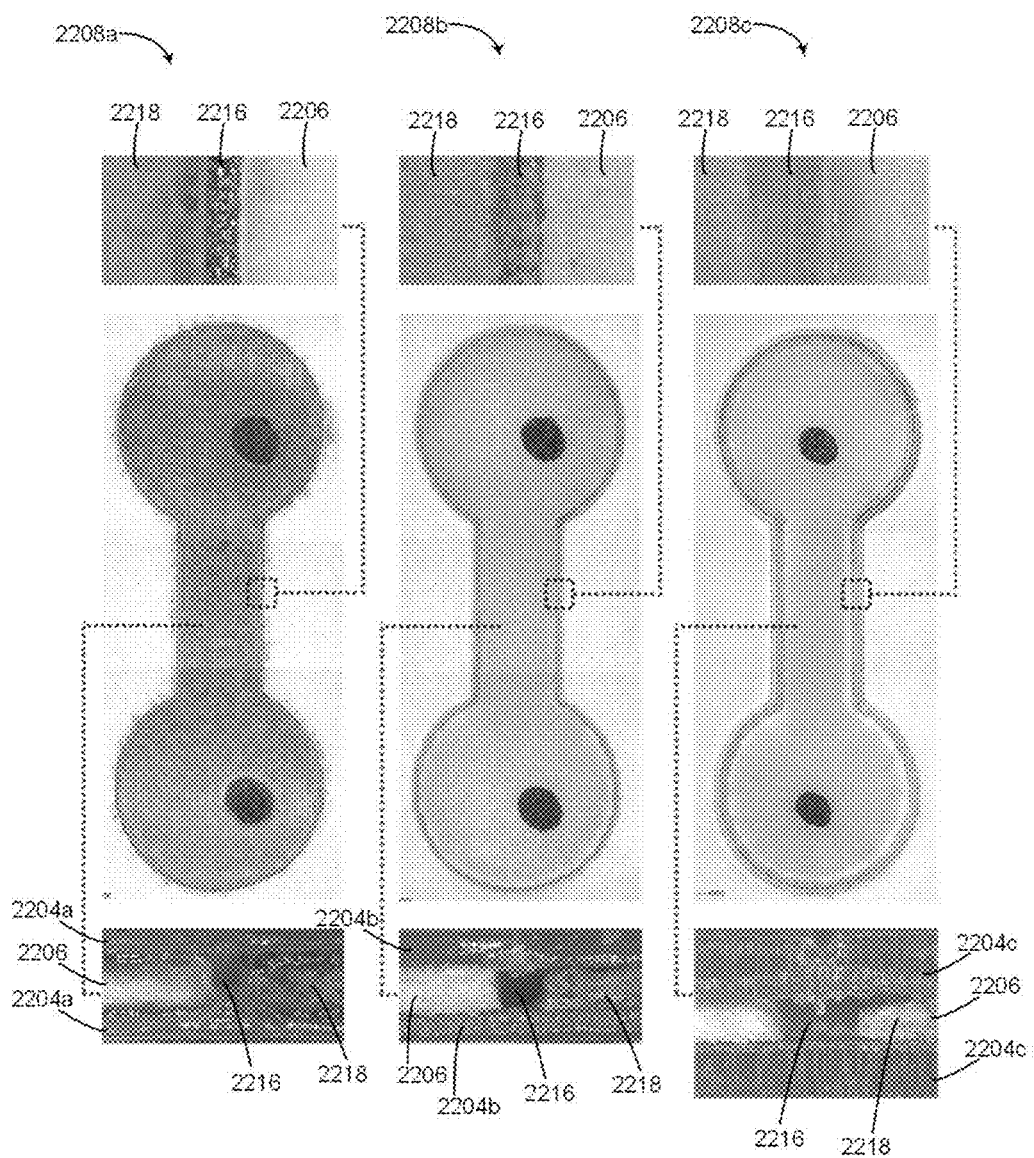
FIG. 22 illustrates exemplary fiber substrate-based fluidic devices having a fourth type of hydrophilic substrate and having hydrophobic films of different thicknesses and/or materials.

FIG. 22 shows devices 2208*a*, 2208*b*, and 2208*c* comprising a hydrophilic substrate 2206 constructed from a different filter paper (e.g., Whatman 1) than the devices shown in FIG. 21. Devices 2208*a*, 2208*b*, and 2208*c* comprise hydrophobic films 2204*a*, 2204*b*, and 2204*c* constructed from polyethylene with an adhesive, polyethylene without an adhesive and having a thickness of 0.005 inches, and polyethylene without an adhesive and having a thickness of 0.01 inches, respectively.

Figure 23:
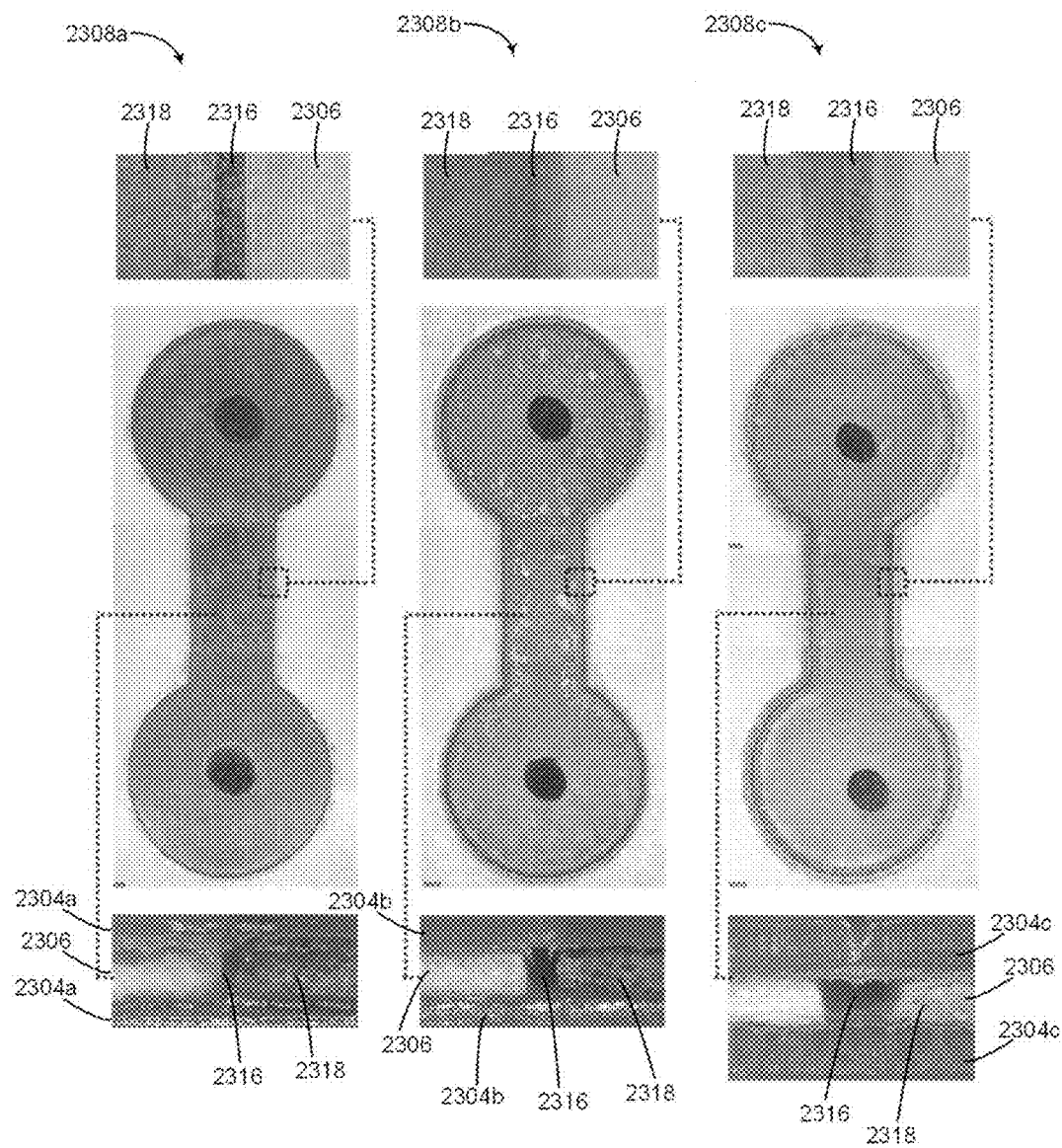
FIG. 23 illustrates exemplary fiber substrate-based fluidic devices having a fifth type of hydrophilic substrate and having hydrophobic films constructed from materials of different thicknesses and/or materials.

FIG. 23 shows devices 2308*a*, 2308*b*, and 2308*c* comprising a hydrophilic substrate 2306 constructed from a different filter paper (e.g., Whatman 42) than the devices shown in FIGS. 21 and 22. Devices 2308*a*, 2308*b*, and 2308*c* comprise hydrophobic films 2304*a*, 2304*b*, and 2304*c* constructed from polyethylene with an adhesive, polyethylene without an adhesive and having a thickness of 0.005 inches, and polyethylene without an adhesive and having a thickness of 0.01 inches, respectively.

Figure 24:
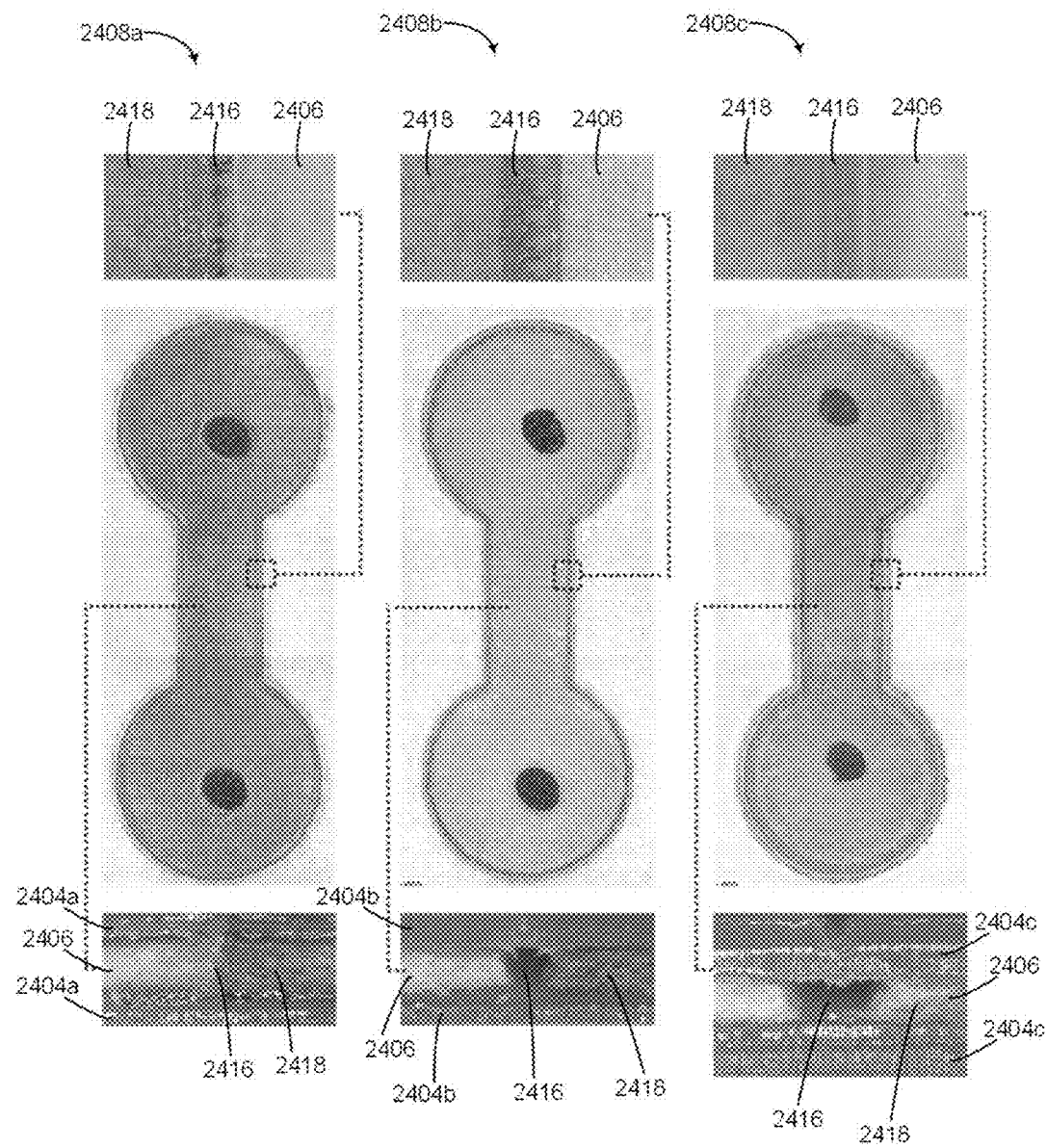
FIG. 24 illustrates exemplary fiber substrate-based fluidic devices having a sixth type of hydrophilic substrate and that have hydrophobic films constructed from materials of different thicknesses and/or materials.

FIG. 24 shows devices 2408*a*, 2408*b*, and 2408*c* comprising a hydrophilic substrate 2406 constructed from a different filter paper (e.g., Whatman 4) than the devices shown in FIGS. 21-23. Devices 2408*a*, 2408*b*, and 2408*c* comprise hydrophobic films 2404*a*, 2404*b*, and 2404*c* constructed from polyethylene with an adhesive, polyethylene without an adhesive and having a thickness of 0.005 inches, and polyethylene without an adhesive and having a thickness of 0.01 inches, respectively.

Test results from devices constructed using glass microfiber and filter papers for the hydrophilic substrate are included Table 5 below. Three variations of polyethylene films were used as supporting materials: polyethylene without adhesive with 0.005" and 0.01" thickness, and polyethylene (0.005" thickness) with acrylic adhesive on one side.

TABLE 5

| | Materials | | | Cutting parameters | | | | | |
|---|---|---|---|---|---|---|---|---|---|
| No | Top | Middle | Bottom | Power (Watts) | Speed (mm/s) | Focal point (mm) | Pulses per inch | Success rate (%) | Channel width (μm) | Barrier width (μm) |
| 1 | PE + adhesive | Glass microfiber | PE + adhesive | Less than 20% success rate was obtained at the optimized cutting parameters | | | | | | |
| 2 | PE (0.005") | Glass microfiber | PE (0.005") | 0.85 | 9.86 | 1.40 | 500 | 92 (n = 25) | 1765 ± 21 | 179 ± 22 |
| 3 | PE + adhesive | Whatman 541 | PE + adhesive | Less than 20% success rate was obtained at the optimized cutting parameters | | | | | | |
| 4 | PE (0.005") | Whatman 541 | PE (0.005") | 0.60 / 0.60 | 7.45 / 9.86 | 1.30 / 1.20 | 250 / 250 | 80 (n = 25) | 1806 ± 20 | 132 ± 14 |
| 5 | PE (0.01") | Whatman 541 | PE (0.01") | 1.50 / 1.50 | 7.45 / 9.86 | 1.30 / 1.20 | 250 / 250 | 88 (n = 25) | 1671 ± 16 | 262 ± 15 |
| 6 | PE + adhesive | Whatman 1 | PE + adhesive | 0.45 / 0.45 | 7.45 / 9.86 | 1.30 / 1.20 | 250 / 250 | 92 (n = 25) | 1909 ± 19 | 55 ± 6 |
| 7 | PE (0.005") | Whatman 1 | PE (0.005") | 0.65 / 0.65 | 7.45 / 9.86 | 1.30 / 1.20 | 250 / 250 | 80 (n = 25) | 1790 ± 22 | 149 ± 11 |
| 8 | PE (0.01") | Whatman 1 | PE (0.01") | 1.50 / 1.50 | 7.45 / 9.86 | 1.30 / 1.20 | 250 / 250 | 84 (n = 25) | 1735 ± 16 | 259 ± 18 |
| 9 | PE + adhesive | Whatman 42 | PE + adhesive | 0.45 / 0.45 | 7.45 / 9.86 | 1.30 / 1.20 | 250 / 250 | 92 (n = 25) | 1929 ± 15 | 43 ± 7 |
| 10 | PE (0.005") | Whatman 42 | PE (0.005") | 0.65 / 0.65 | 7.45 / 9.86 | 1.30 / 1.20 | 250 / 250 | 80 (n = 25) | 1790 ± 18 | 152 ± 8 |
| 11 | PE (0.01") | Whatman 42 | PE (0.01") | 1.50 / 1.50 | 7.45 / 9.86 | 1.30 / 1.20 | 250 / 250 | 100 (n = 25) | 1704 ± 18 | 238 ± 20 |
| 12 | PE + adhesive | Whatman 4 | PE + adhesive | 0.45 / 0.45 | 7.45 / 9.86 | 1.40 / 1.20 | 250 / 250 | 100 (n = 25) | 1918 ± 20 | 50 ± 8 |
| 13 | PE (0.005") | Whatman 4 | PE (0.005") | 0.65 / 0.65 | 7.45 / 9.86 | 1.40 / 1.20 | 250 / 250 | 92 (n = 25) | 1792 ± 17 | 157 ± 10 |
| 14 | PE | Whatman | PE | 1.50 | 7.45 | 1.40 | 250 | 100 (n = 25) | 1692 ± 28 | 251 ± 17 |

TABLE 5-continued

| | Materials | | | Cutting parameters | | | | | Channel width (μm) | Barrier width (μm) |
|---|---|---|---|---|---|---|---|---|---|---|
| No | Top | Middle | Bottom | Power (Watts) | Speed (mm/s) | Focal point (mm) | Pulses per inch | Success rate (%) | | |
| | (0.01") | 4 | (0.01") | 1.50 | 9.86 | 1.20 | 250 | | | |

FIGS. 25A-26B show images of devices 2508a, 208b, 2608a, and 2608b manufactured according to the methods disclosed herein that show how the voids created by ablating the hydrophilic substrate serve as robust fluid barriers. Specifically, because complex chemical and biochemical analysis often require working with surfactants, acidic, basic, and organic solvents, materials used for the fiber substrate-based fluidic devices should be chemically resistant in such embodiments. The voids created by ablating the hydrophilic substrate according the methods disclosed herein provide stronger fluid barriers to surfactants and organic solvents than conventional hydrophobic barriers. Thus, the devices disclosed herein are less likely to leak and are more robust than conventional paper-based microfluidic devices.

Figure 25A:
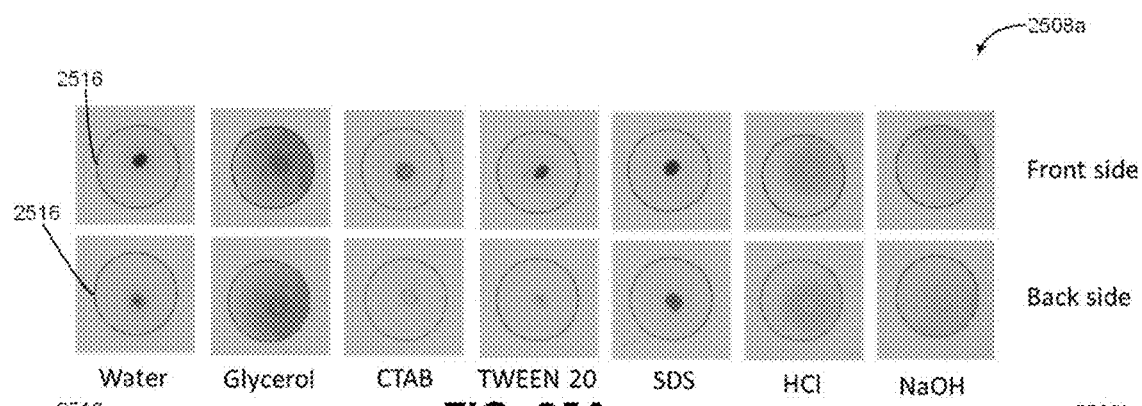
FIG. 25A shows images of exemplary fiber substrate-based fluidic devices having a first type of hydrophilic substrate and a first type of hydrophobic film, exposed to different liquid samples.
Figure 25B:
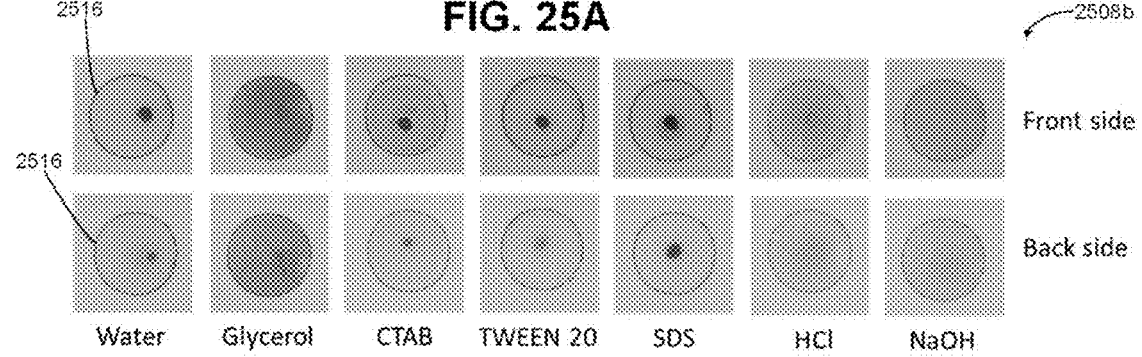
FIG. 25B shows images of exemplary fiber substrate-based fluidic devices having the first type of hydrophilic substrate and a second type of hydrophobic film, exposed to different liquid samples.

In FIGS. 25A and 25B, the hydrophilic substrate of both devices 2508a and 2508b was constructed from nitrocellulose and the hydrophobic film of the device 2508a (FIG. 25A) was constructed from polyethylene while the hydrophobic film of the device 2508b (FIG. 25B) was constructed from polyethylene with an adhesive. As shown, the fluid barriers 2516 held up well when exposed to water, glycerol, a variety of surfactants, an acid, and a base. In FIGS. 26A and 26B, the hydrophilic substrate of both devices 2608a and 2608b was constructed from a filter paper (e.g., Whatman 4) and the hydrophobic film of the device 2608a (FIG. 26A) was constructed from polyethylene and the hydrophobic film of the device 2608b (FIG. 26B) was constructed from polyethylene with an adhesive. As shown, the fluid barriers 2616 held up well when exposed to water, glycerol, a variety of surfactants, an acid, a base, and organic solvents.

The developed methods for fabrication of the embodiments may be simple, rapid, low-cost, precise, and feasible for mass production. These methods make it possible to fabricate devices inexpensively even when using relatively expensive membranes, such as nitrocellulose. The devices can further be compatible with acids, bases, surfactants, and organic solvents, such that a variety of assays can be applied on the devices. Thus, the devices herein can be designed in a high throughput format where an array of devices resembles a well plate pitch, such that the devices are compatible with existing fluorescence plate readers. The device embodiments described herein also can be used for bioassays, such as immunoglobulin bioassays. For example, an analyte-containing solution (e.g., a solution containing an antigen or antibody) can be loaded onto the fiber substrate-based fluidic device followed by a detection reagent. The detection reagent can be an immunoglobulin, e.g., an antibody, and an anti-antibody conjugated with a fluorescent signaling molecule. The detection reagent specifically binds to the analyte and can provide a detectable signal.

The device embodiments, methods of making the device embodiments, and methods of using the device embodiments are described in more detail in the following examples.

Additional Examples of the Disclosed Technology

In view of the aforementioned implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A method, comprising:
bonding a hydrophobic film to a hydrophilic substrate;
directing a laser beam through the hydrophobic film to the hydrophilic substrate, wherein the hydrophobic film transmits at least 80% of the incident radiant power of the laser beam; and
ablating the hydrophilic substrate with the laser beam without ablating the hydrophobic film.

Example 2. The method of any example herein, particularly example 1, wherein the hydrophilic substrate comprises one or more of nitrocellulose, cellulose, and glass microfiber.

Example 3. The method of any example herein, particularly example 1 or example 2, wherein the hydrophobic film comprises a waxy or polymeric film, selected from one or more of a wax-polyolefin blend, polyethylene, polypropylene, polylactic acid, polymethylmethacrylate, polydimethylsiloxane, and ethylene vinyl acetate.

Example 4. The method of any example herein, particularly any one of examples 1-3, wherein the hydrophobic film has a flash point of at least 250° C. and wherein the hydrophilic substrate has a flash point of at most 20° C.

Example 5. The method of any example herein, particularly any one of examples 1-4, wherein the laser is a carbon dioxide laser.

Example 6. The method of any example herein, particularly any one of examples 1-5, wherein laser beam also melts the hydrophobic film and welds it to the hydrophilic substrate.

Example 7. The method of any example herein, particularly any one of examples 1-6, wherein the ablating the hydrophilic substrate comprises ablating the hydrophilic substrate to form a well and/or a fluidic channel fluidly coupled to the well.

Example 8. The method of any example herein, particularly any one of examples 1-7, further comprising forming an opening, channel, or well in the hydrophobic film before bonding the hydrophobic film to the hydrophilic substrate.

Example 9. The method of any example herein, particularly any one of examples 1-8, wherein bonding the hydrophobic film to the hydrophilic substrate comprises bonding a first hydrophobic film to a first side of the hydrophilic substrate, bonding a second hydrophobic film to an opposite second side of the hydrophilic substrate, or both, and wherein the ablating the hydrophilic substrate with the laser beam comprises directing the laser beam through at least one of the first hydrophobic film and/or the second hydrophobic film without ablating either of the first or second hydrophobic films.

Example 10. The method of any example herein, particularly any one of examples 1-9, wherein the bonding the hydrophobic film to the hydrophilic substrate forms a stacked component, and wherein the method further comprises bonding two or more stacked components together after ablating the hydrophilic substrate of each stacked component with the laser.

Example 11. The method of any example herein, particularly any one of examples 1-10, wherein the bonding the hydrophobic film to the hydrophilic substrate comprises thermally laminating the hydrophobic film and the hydrophilic substrate by exposing them to a temperature of at least 90° C. with or without compression, Example 12. The method of any example herein, particularly any one of examples 1-11, wherein the bonding the hydrophobic film to the hydrophilic substrate comprises adhering of the hydrophobic film to the hydrophilic substrate with an acrylic adhesive.

Example 13. The method of any example herein, particularly any one of examples 1-12, wherein the bonding is performed before the ablating.

Example 14. The method of any example herein, particularly any one of examples 1-13, wherein ablating the hydrophilic substrate comprises combusting the hydrophilic substrate with the laser beam by heating the hydrophilic substrate at a temperature equal to or greater than the flash point of the hydrophilic substrate.

Example 15. A method for manufacturing a microfluidic device, comprising:
 bonding a first hydrophobic film to a first side of a hydrophilic substrate and bonding a second hydrophobic film to an opposite second side of the hydrophilic substrate; and
 directing a laser beam through at least one of the hydrophobic films without ablating the hydrophobic film and ablating the hydrophilic substrate with the laser beam, wherein the hydrophobic film transmits at least 80% of the incident radiant power of the laser beam.

Example 16. The method of any example herein, particularly examples 15, further comprising forming an opening, channel, or well in the first hydrophobic film and/or the second hydrophobic film before bonding the films to the hydrophilic substrate.

Example 17. A method for manufacturing a microfluidic device, comprising:
 stacking three hydrophobic films and two hydrophilic substrates in an alternating order to form a 5-layer stacked component;
 bonding the 5-layer stacked component; and
 ablating one of the hydrophilic substrates by directing a laser beam through one of the hydrophobic films from a first side of the 5-layer stacked component and ablating the other one of the hydrophilic substrates by directing the laser beam through one of the other hydrophobic films from an opposite second side of the 5-layer stacked component.

Example 18. A method for manufacturing a microfluidic device, comprising:
 bonding a wax-polyolefin film on opposite sides of a nitrocellulose substrate; and
 forming wells and/or channels in the nitrocellulose substrate by ablating the nitrocellulose substrate with a carbon dioxide laser;
  wherein the layer of the wax-polyolefin film is not ablated by the laser.

Example 19. The method of any example herein, particularly example 18, wherein the bonding the wax-polyolefin film comprises one or more of laminating, compressing, and/or adhering the wax-polyolefin film on opposite sides of the nitrocellulose substrate.

Example 20. A microfluidic diagnostic device for detecting the presence and/or concentration of an analyte, the fiber substrate-based fluidic device comprising:
 a nitrocellulose substrate sandwiched between two bonded layers of a hydrophobic film, wherein the nitrocellulose substrate comprises a plurality of wells and/or fluidic channels formed in the nitrocellulose substrate such that boundaries of the wells and/or fluidic channels are defined by the nitrocellulose and at least one of the bonded layers of the hydrophobic film.

In view of the many possible embodiments to which the principles of the present disclosure may be applied, it should be recognized that the illustrated embodiments are only preferred examples and should not be taken as limiting the scope of the present disclosure. Rather, the scope is defined by the following claims.

We claim:

1. A method, comprising:
 bonding a hydrophobic film to a hydrophilic substrate;
 directing a laser beam through the hydrophobic film to the hydrophilic substrate, wherein the hydrophobic film transmits at least 80% of the incident radiant power of the laser beam; and
 ablating the hydrophilic substrate with the laser beam without ablating the hydrophobic film.

2. The method of claim 1, wherein the hydrophilic substrate comprises nitrocellulose, cellulose, and/or glass microfiber.

3. The method of claim 1, wherein the hydrophobic film comprises a waxy or polymeric film, selected from one or more of a wax-polyolefin blend, polyethylene, polypropylene, polylactic acid, polymethylmethacrylate, polydimethylsiloxane, and ethylene vinyl acetate.

4. The method of claim 1, wherein the hydrophobic film has a flash point of at least 250° C. and wherein the hydrophilic substrate has a flash point of at most 20° C.

5. The method of claim 1, wherein the laser is a carbon dioxide laser.

6. The method of claim 1, wherein laser beam also melts the hydrophobic film and welds it to the hydrophilic substrate.

7. The method of claim 1, wherein the ablating the hydrophilic substrate comprises ablating the hydrophilic substrate to form a well and/or a fluidic channel fluidly coupled to the well.

8. The method of claim 1, further comprising forming an opening, channel, or well in the hydrophobic film before bonding the hydrophobic film to the hydrophilic substrate.

9. The method of claim 1, wherein bonding the hydrophobic film to the hydrophilic substrate comprises bonding a first hydrophobic film to a first side of the hydrophilic substrate, bonding a second hydrophobic film to an opposite second side of the hydrophilic substrate, or both, and wherein the ablating the hydrophilic substrate with the laser beam comprises directing the laser beam through at least one of the first hydrophobic film and/or the second hydrophobic film without ablating either of the first or second hydrophobic films.

10. The method of claim 1, wherein the bonding the hydrophobic film to the hydrophilic substrate forms a stacked component, and wherein the method further comprises bonding two or more stacked components together after ablating the hydrophilic substrate of each stacked component with the laser.

11. The method of claim 1, wherein the bonding the hydrophobic film to the hydrophilic substrate comprises thermally laminating the hydrophobic film and the hydrophilic substrate by exposing them to a temperature of at least 90° C. with or without compression.

12. The method of claim 1, wherein the bonding the hydrophobic film to the hydrophilic substrate comprises adhering of the hydrophobic film to the hydrophilic substrate with an acrylic adhesive.

13. The method of claim 1, wherein the bonding is performed before the ablating.

14. The method of claim 1, wherein ablating the hydrophilic substrate comprises combusting the hydrophilic substrate with the laser beam by heating the hydrophilic substrate at a temperature equal to or greater than the flash point of the hydrophilic substrate.

15. A method for manufacturing a microfluidic device, comprising:
    bonding a first hydrophobic film to a first side of a hydrophilic substrate and bonding a second hydrophobic film to an opposite second side of the hydrophilic substrate; and
    directing a laser beam through at least one of the hydrophobic films without ablating the hydrophobic film and ablating the hydrophilic substrate with the laser beam, wherein the hydrophobic film transmits at least 80% of the incident radiant power of the laser beam.

16. The method of claim 15, further comprising forming an opening, channel, or well in the first hydrophobic film and/or the second hydrophobic film before bonding the films to the hydrophilic substrate.

* * * * *

UNITED STATES PATENT AND TRADEMARK OFFICE
CERTIFICATE OF CORRECTION

PATENT NO. : 11,813,608 B2
APPLICATION NO. : 17/481159
DATED : November 14, 2023
INVENTOR(S) : Remcho et al.

It is certified that error appears in the above-identified patent and that said Letters Patent is hereby corrected as shown below:

In the Specification

Column 2, Lines 38-39 "wavenumbers, including the wavenumber" should read --wavelengths, including the wavelength--

Column 2, Line 43 "wavenumbers, including the wavenumber" should read --wavelengths, including the wavelength--

Column 7, Lines 53-56 "including instrument-vendor proprietary programs, including instrument-vendor proprietary programs." should read --including instrument-vendor proprietary programs.--

Column 8, Line 52 "hydrophilic" should read --hydrophobic--

Column 8, Line 54 "hydrophilic" should read --hydrophobic--

Column 8, Line 62 Table 1 "Whatman 1" should read --Whatman 541--

Column 8, Line 63 Table 1 "Whatman 4" should read --Whatman 1--

Column 8, Line 64 Table 1 "Whatman 541" should read --Whatman 42--

Column 8, Line 65 Table 1 "Whatman 42" should read --Whatman 4--

Column 9, Line 6 Table 2 "108" should read --108, 156--

Column 11, Line 5 "fluid barrier 322$h$" should read --fluid barrier 316$g$--

Column 11, Line 9 "channel 322$h$" should read --channel 322$g$--

Column 11, Lines 11-12 "As shown in FIG. 4A," should read --As shown in FIG. 3A,--

Signed and Sealed this
Ninth Day of April, 2024

Katherine Kelly Vidal
*Director of the United States Patent and Trademark Office*

Column 11, Line 29 "fluid barrier 316*j*" should read --fluid barrier 416*i*--

Column 14, Line 64 "a central well 1024 to four" should read --a central well to four--

Column 18, Line 60 "fried" should read --dried--

Column 21, Lines 12-13 "devices 2508*a*, 208*b*, 2608*a*, and 2608*b* manufactured" should read --devices 2508*a*, 2508*b*, 2608*a*, and 2608*b* manufactured--